(12) United States Patent
Khwaja et al.

(10) Patent No.: US 10,921,892 B2
(45) Date of Patent: Feb. 16, 2021

(54) PERSONALIZED TACTILE OUTPUT

(71) Applicant: SUBPAC, INC., San Francisco, CA (US)

(72) Inventors: Sarosh Sultan Khwaja, San Mateo, CA (US); Todd Christopher Chernecki, San Francisco, CA (US); John Thomas Alexiou, Palo Alto, CA (US)

(73) Assignee: SUBPAC, INC., San Francisco, CA (US)

( * ) Notice: Subject to any disclaimer, the term of this patent is extended or adjusted under 35 U.S.C. 154(b) by 66 days.

(21) Appl. No.: 16/267,208

(22) Filed: Feb. 4, 2019

(65) Prior Publication Data

US 2020/0249758 A1    Aug. 6, 2020

(51) Int. Cl.
*G06F 3/00*      (2006.01)
*G06F 3/01*      (2006.01)
*G06F 3/16*      (2006.01)

(52) U.S. Cl.
CPC .............. *G06F 3/016* (2013.01); *G06F 3/167* (2013.01); *H01H 2215/03* (2013.01)

(58) Field of Classification Search
CPC ...... G06F 3/04847; G06F 3/033; G06F 3/038; G06F 3/016; G06F 3/167; G03B 21/14; G03B 2206/00; H01H 2215/03
USPC ............................................ 340/407.1, 407.3
See application file for complete search history.

(56) References Cited

U.S. PATENT DOCUMENTS

| | | | | |
|---|---|---|---|---|
| 4,334,280 A * | 6/1982 | McDonald | ............. | G04G 13/00 340/384.5 |
| 5,388,992 A * | 2/1995 | Franklin | ................. | G06F 3/016 340/407.1 |
| 5,646,589 A * | 7/1997 | Murray | ................ | G08B 3/1041 340/7.58 |
| 6,177,881 B1 * | 1/2001 | Castaneda | ............ | G08B 3/1041 340/407.1 |
| 7,788,032 B2 * | 8/2010 | Moloney | ............ | G01C 21/3652 340/407.1 |
| 7,969,287 B2 * | 6/2011 | Tschirhart | ............. | B60W 50/16 340/384.1 |
| 8,902,051 B2 * | 12/2014 | Smith | ..................... | G06F 3/016 340/407.1 |
| 2005/0046551 A1 * | 3/2005 | Cranfill | ................. | B06B 1/0276 340/407.1 |

(Continued)

*Primary Examiner* — Ojiako K Nwugo
(74) *Attorney, Agent, or Firm* — Maschoff Brennan

(57) ABSTRACT

A method may include accessing audio data, obtaining tactile audio data associated with the audio data, and, while reproducing the audio data, reproducing a tactile audio response according to the tactile audio data in a manner personalized to a user. The tactile audio data may be reproduced via an electroactive transducer to transfer the tactile audio response to a body of a user. Another method may include obtaining audio data, parsing the audio data to identify an audio component that includes an audio layer or an audio source, and identifying an audio attribute of the audio component. The method may also include selecting the audio component to accompany a tactile audio response, generating tactile audio data that describes the tactile audio response for the selected audio component, and coordinating the tactile audio data of the selected audio component with the audio data of the selected audio component.

20 Claims, 10 Drawing Sheets

(56) References Cited

U.S. PATENT DOCUMENTS

| | | | |
|---|---|---|---|
| 2006/0049920 A1* | 3/2006 | Sadler | G06F 3/016 340/407.1 |
| 2007/0139167 A1* | 6/2007 | Gilson | G09B 21/003 340/407.1 |
| 2007/0178942 A1* | 8/2007 | Sadler | H04M 1/03 455/567 |
| 2008/0143496 A1* | 6/2008 | Linjama | G06F 3/016 340/407.1 |
| 2009/0128306 A1* | 5/2009 | Luden | G06F 3/016 340/407.1 |
| 2009/0315688 A1* | 12/2009 | Kong | H04M 1/72519 340/407.1 |
| 2010/0217413 A1* | 8/2010 | Seiler | H04R 1/02 700/94 |
| 2012/0126959 A1* | 5/2012 | Zarrabi | H01L 41/293 340/407.1 |
| 2012/0229264 A1* | 9/2012 | Company Bosch | B06B 1/0253 340/407.1 |
| 2012/0306631 A1* | 12/2012 | Hughes | G09B 21/009 340/407.1 |
| 2013/0207793 A1* | 8/2013 | Weaber | G06F 1/1626 340/407.2 |
| 2014/0347176 A1* | 11/2014 | Modarres | G08B 6/00 340/407.1 |
| 2015/0061846 A1* | 3/2015 | Yliaho | H04N 21/8547 340/407.1 |
| 2015/0317885 A1* | 11/2015 | Ramstein | G08B 6/00 340/407.1 |
| 2015/0348379 A1* | 12/2015 | Moussette | G11B 27/10 340/407.1 |
| 2016/0063826 A1* | 3/2016 | Morrell | H04L 12/1895 340/407.1 |
| 2016/0063827 A1* | 3/2016 | Moussette | G06F 11/0763 340/407.2 |
| 2016/0171846 A1* | 6/2016 | Brav | G08B 6/00 340/407.1 |
| 2016/0180661 A1* | 6/2016 | Ullrich | G08B 6/00 340/407.1 |
| 2016/0196726 A1* | 7/2016 | Saito | G06F 1/1684 340/407.1 |
| 2016/0203685 A1* | 7/2016 | Schwartz | G09B 21/009 340/407.1 |
| 2017/0245070 A1* | 8/2017 | Inagaki | G10H 1/00 |
| 2019/0167105 A1* | 6/2019 | Shrubsole | A61B 5/165 |

* cited by examiner

PERSONALIZED TACTILE OUTPUT

FIELD

The application relates generally to personalized tactile output.

BACKGROUND

For hundreds of years, people have enjoyed music, both playing music and listening to music. In recent years, the types of music available for listening has expanded exponentially, as has the equipment by which the user may listen to music. Often, the equipment by which a user may hear, or listen to, music may be located in the same room where the user is located and the playback of music may be controlled by the user.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a method that may include accessing audio data. The method may include obtaining tactile audio response associated with the audio data. The method may also include, while reproducing the audio data, reproducing a tactile audio response according to the tactile audio data in a manner personalized to a user. The tactile audio data may be reproduced via an electroactive transducer configured to transfer the tactile audio response to a body of a user.

According to an aspect of another embodiment, a method may include obtaining audio data, and parsing the audio data to identify an audio component that includes an audio layer or an audio source. The method may also include identifying an audio attribute of the audio component. The method may additionally include, based on the audio attribute of the audio component, selecting the audio component to accompany a tactile audio response. The method may also include generating tactile audio data that describes the tactile audio response for the selected audio component. The tactile audio data may be specific to the audio data, and may be configured to instruct an electroactive transducer to transfer the tactile audio response described in the tactile audio data to a body of a user. The method may also include coordinating the tactile audio data of the selected audio component with the audio data of the selected audio component.

The object and advantages of the embodiments will be realized and achieved at least by the elements, features, and combinations particularly pointed out in the claims. It is to be understood that both the foregoing general description and the following detailed description are exemplary and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Listening to an audio piece, such as a music track, may be one aspect of an audio experience for a user. Feeling the audio piece may be another aspect of the audio experience for the user. In some instances, feeling the audio may simply include turning up the volume of the audio loud enough to be felt. In contrast, embodiments of the present disclosure may relate to the generation of vibrations (which may be referred to as a tactile audio response) associated with the audio piece. The generation of such a tactile audio response may allow the user to feel a physical dimension of the sound they hear, which may result in an immersive experience for both acoustic perception and tactile perception of the user.

In some embodiments, the immersive audio experience described above may be enhanced by personalizing the tactile audio response felt in connection to the audio piece. For example, one user may prefer to feel a tactile audio response when drums are heard in the audio piece, while another user may dislike drums and prefer that a tactile audio response is felt as bass guitar notes and riffs are heard in the audio piece but not based on drums. In some embodiments, the tactile audio response may be user-specific according to user preferences with respect to the audio piece. Additionally or alternatively, the tactile audio response may be environment-specific such that the tactile audio response is personalized according to an environment of a user and/or an environment of a tactile audio device reproducing the tactile audio response.

In some embodiments, the tactile audio response may be based on the audio data without regard to user preferences. For example, a single version of an audio piece may be generated. The single version of the audio piece may include a tactile audio response associated with various audio components of the audio piece while excluding a tactile audio response for other various audio components of the audio piece. In another example, given a particular audio piece, multiple versions of the audio piece may be generated. Each version may include a different tactile audio response according to the audio data. For instance, one version of the audio piece may be a "guitar lover" version having a tactile audio response associated with at least the guitar in the audio piece. Another version of the audio piece may be a "drummer maniac" version having a tactile audio response associated with at least the drums in the audio piece.

These and other embodiments are described with reference to the appended figures. In the appended figures, features and components with like item numbers indicate similar structure and function unless described otherwise. The appended figures are not necessarily to scale.

Figure 1:
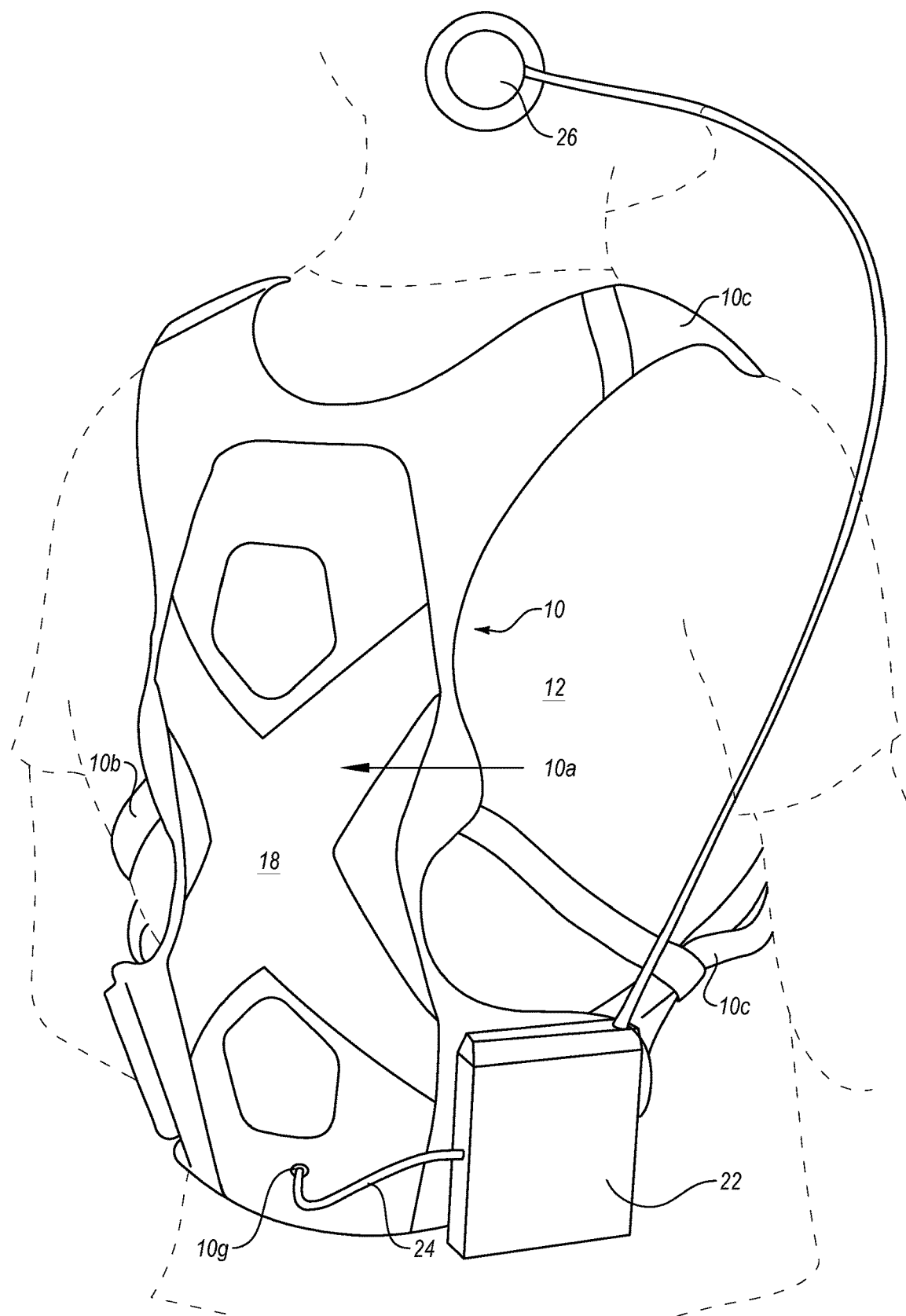
FIG. 1 illustrates an example tactile audio device that may be implemented in an example wearable application of a backpack worn on a body of a user.

Turning to the figures, FIG. 1 illustrates an example tactile audio device 10 that may be implemented in an example wearable application of a backpack worn on a body of a user arranged in accordance with at least one embodiment described in the present disclosure. A tactile audio device 10 may transfer a personalized tactile audio response to the body of the user. As illustrated, the tactile audio device 10 is depicted as a wearable backpack that is positioned adjacent a body 12 of the user. In another embodiment, the tactile audio device 10 may be a seat such as that shown in FIG. 3 (e.g. movie theater seat, car seat, etc.). The tactile audio device 10 may include a back region 10a that is positioned proximal to the body 12 of the user. Straps 10b, 10c may pass over shoulders of the user, wrap under arms of the user, and extend rearward to rejoin the back region 10a. A pair of chest straps 10d, 10e may connect to the straps 10b and 10c, respectively. A buckle may selectively secure the chest straps 10d, 10e together (not shown), thereby securing the tactile audio device 10 around the body 12 of the user. The straps 10b-10e may be selectively adjustable so that the tactile audio device 10 may be retained snugly against the body 12 of the user.

Figure 2:
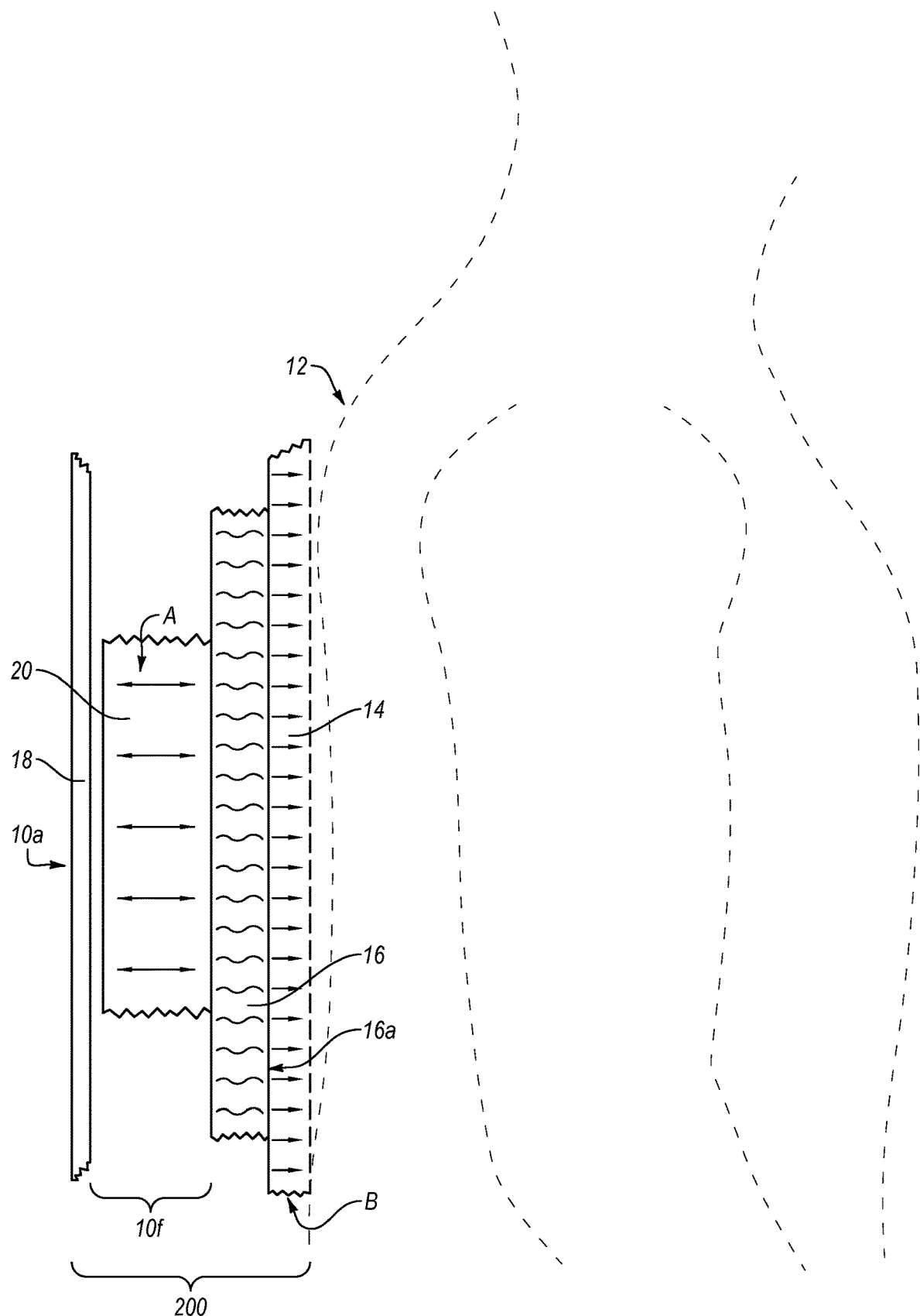
FIG. 2 illustrates an example cross-section of an example vibrotactile membrane that may be implemented in a tactile audio device.
Figure 3:
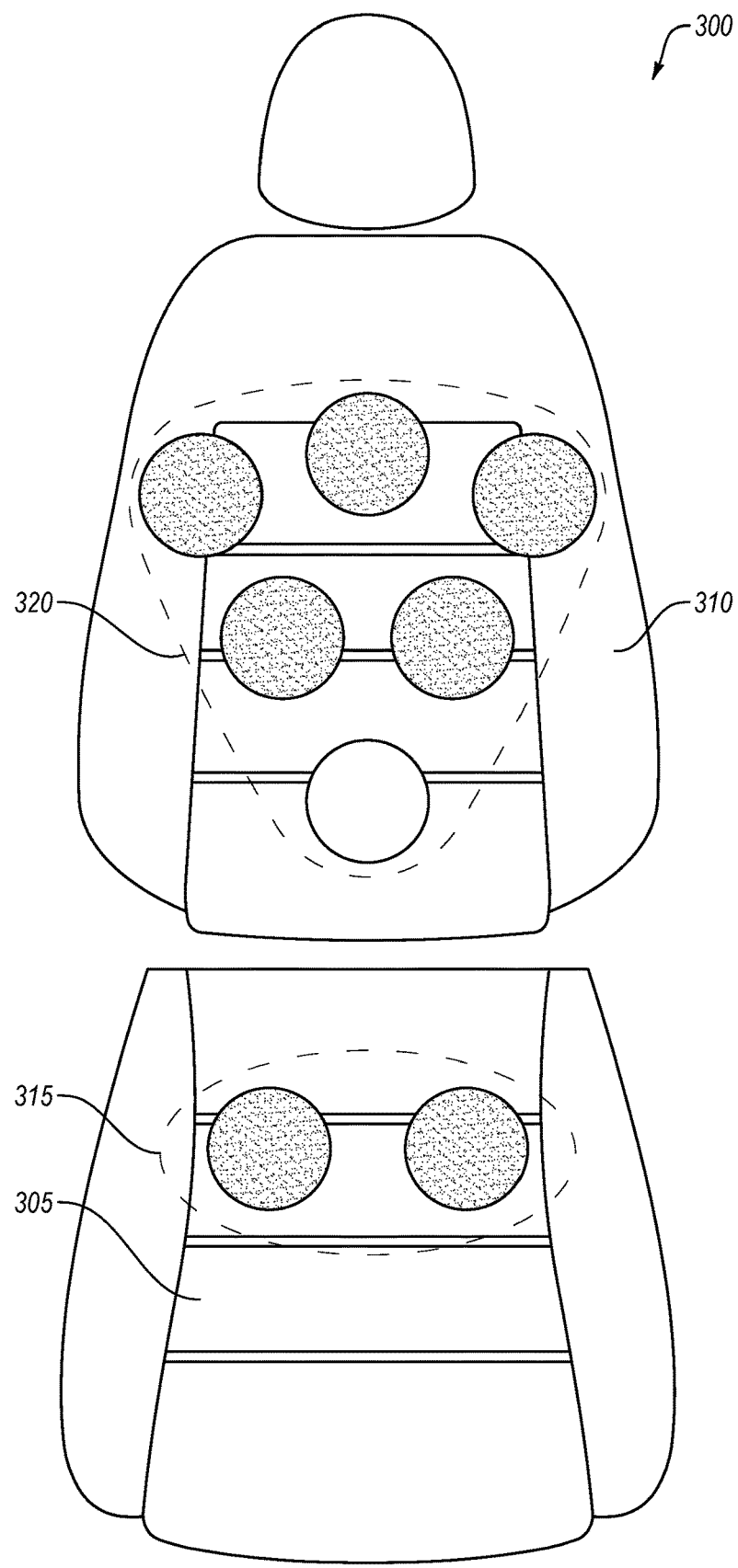
FIG. 3 illustrates another example tactile audio device that may be implemented in an example non-wearable application of a seat.

FIG. 2 illustrates an example cross-section of an example vibrotactile membrane (VTM) 200 that may be implemented in the tactile audio device 10 of FIGS. 1 and 3. Through the VTM 200, the tactile audio device 10 may transfer a personalized tactile audio response to the body 12 of the user. Additionally or alternatively, the VTM 200 may also provide comfort and ergonomic functionality. For example, without the VTM 200 as described herein, the vibrations and the displacement of a transducer 20 may be harsh, uncomfortable and incompatible with an audio experience. Other systems involving tactile transducers may use foams and the like for comfort and aesthetics; however, these other systems do not provide the audio and tactile experience, much less for any array of personalized tactile output in conjunction with an audio piece.

Specifically with reference to FIGS. 1 and 2, a back region 10a may include an enclosure that may include a primary membrane 14 that is configured to be positioned adjacent the body 12 of the user, a secondary membrane 16 that is adjacent to the primary membrane 14, and an exterior membrane 18 that forms the exterior surface of the tactile audio device 10 and is spaced a distance from the secondary membrane 16. An interior cavity 10f may be defined between an interior surface of the exterior membrane 18 and the secondary membrane 16. In some embodiments, the primary membrane 14 and the secondary membrane 16 may be implemented as a single membrane. Additionally or alternatively, one or more additional membranes may be utilized in addition to the primary membrane 14 and secondary membrane 16 to alter the transmission of vibrations to the body 12 of the user.

The primary membrane 14 may be a large, rigid membrane and may be made of any of a number of thermoplastics, such as polypropylene, high density polyethylene (HDPE), polyvinyl chloride (PVC), and the like, or of composite materials, such as carbon-fiber. This secondary membrane 16 may be a microcellular polymer membrane 104 made of microcellular elastomers (EVA), urethanes (PU), rubbers, and the like; but otherwise may include microcellular polyurethane, which has a great dampening effect on vibrations. The secondary membrane 16 may have less surface area than the primary membrane 14.

At least one electroactive transducer, such as the transducer 20, may be positioned within the interior cavity 10f and between the exterior membrane 18 and the secondary membrane 16. The transducer 20 in the various embodiments of the present disclosure may include a tactile transducer. The transducer 20 may encompass any components that may be used to impart visceral sensation to the user of the tactile audio device 10.

The transducer 20 may be positioned on the secondary membrane 16 or may be embedded in the secondary membrane 16. Other materials may be utilized within the back region 10a to provide the enclosure formed thereby with structure, rigidity and strength. While these materials may form part of the enclosure, they are not discussed further herein.

The tactile audio device 10 may be provided with a control box 22 that is selectively securable to the back region 10a in any suitable fashion. For example, wiring 24 may extend outwardly from the control box 22 and into the interior cavity 10f (FIG. 2) of the back region 10a of the tactile audio device 10 through an aperture 10g in the exterior membrane 18. The control box 22 may be operatively engaged with one or more transducers 20 located within the interior cavity 10f of the back region 10a. Each transducer 20 may be any type of transducer that converts an electric signal into motion. The transducer 20 may include tactile transducers, exciters, piezoelectric actuators, piston drivers or any other mechanism that translates an electric signal received from the control box 22 or another source into motion. The electric signal may be delivered via the wiring 24 or may be delivered wirelessly, such as by way of a Bluetooth® signal or in any other suitable manner. Headphones 26 may be selectively operatively engaged with the control device 22.

The transducer 20 may be directly attached to the secondary membrane 16 or the transducer 20 may be embedded in secondary membrane 16. The transducer 20 may include a magnet 24 that moves back and forth and thereby may generate vibrations such as those indicated by the arrows "A" in FIG. 2. The magnet 24 may be of a size similar to a hockey puck and have a weight suitable for generating vibrations. In such an embodiment, when the magnet 24 moves back and forth, it may create a vibration that a person may feel. Vibrations "A" may be dampened by the secondary membrane 16 and may be dissipated across a surface area 16a of the secondary membrane 16. The primary membrane 14 may be engaged with the secondary membrane 16. The primary membrane 14 may collect the vibrations from the secondary membrane 16 and may transfer the vibrations "B" (FIG. 2) to the body 12 of the user. The primary membrane 14 may include a large, rigid membrane that has approximately the same surface area as a region of the tactile audio device 10 proximal to the body 12 of the user. The vibrations "B" may be transferred to the body 12 of the user and produce visceral sensations in the body 12 of the user. These visceral sensations that may be experienced by the user and may cause the user to feel the music or sounds through the body 12 of the user. In some embodiments, the transducer 20 may be wearable and configured to be integrated with a backpack, a vest, a body suit, a garment, a piece of clothing, or any other suitable wearable.

These and other embodiments in which personalized tactile output may be implemented may be discussed further in U.S. application Ser. No. 15/588,081 filed on May 5, 2017, and is entitled "TACTILE SOUND DEVICE HAVING ACTIVE FEEDBACK SYSTEM," the contents of which is incorporated by reference in its entirety.

FIG. 3 illustrates another example tactile audio device that may be implemented in an example non-wearable application of a seat 300. The seat 300 may be integrated with an audio tactile device having transducers to transfer a personalized tactile audio response to the body of the user. As illustrated, the seat 300 may include a seat bottom 305 having a first transducer arrangement 315, and a seat top 310 having a second transducer arrangement 320.

In some embodiments, the seat 300 may be a seat or any other human supporting structure, such as for example a bed, a couch, or the like. The first transducer arrangement 315 and the second transducer arrangement 320 may include transducers that are the same as or similar to the transducer 20 of FIGS. 1-2. Additionally or alternatively, each transducer element in the first transducer arrangement 315 and the second transducer arrangement 320 may be coupled to a common distributive element such that a range of tactile generations may be undertaken across the complete surface and/or any part of the seat 300.

In some embodiments the transducer arrangements 315 and 320 may be configured for one or more contexts, such as, for example, seating in a motor vehicle. The transducer arrangements 315 and 320 may help to provide one or more of the characteristics of the output of the transducer arrangements. For example, each transducer in the transducer arrangements 315 and 320 may be geometrically/spatially positioned for a certain size/weight of the user, a specific type of vehicle, or a desired output intensity. For example, the second transducer arrangement 320 for the seat top 310 may be configured to have more transducers positioned proximate to an upper portion of the torso of the user. However, other positional relationships may be implemented, such as more transducers positioned proximate to a lower portion of the torso of the user, or vertically aligned so as to be positioned proximate to a spine of the user. For example, when the transducers are placed against the spine, theses vibrations may be transmitted through bones of the user to the inner ear to provide a sense of hearing. In the transducer arrangements described herein, bone conduction provides one example method for creating and integrating physioacoustic sensations to optimize an experience of the user.

The relationship between the positioning of the one or more transducers placed on the spine and the experience of the user may be adapted for specific contexts. For example if the transducer is placed at the base of the spine, such as at the bottom of a cinema seat (e.g., the seat bottom 305), then this positional arrangement may help to provide the deeper frequencies that may be found in a movie soundtrack. If the one or more transducers are placed at the mid back, for example between the shoulder blades, these may provide the higher lower frequencies, such as those encountered in music, and may be better suited for deployment in a vehicle seat.

These and other embodiments in which personalized tactile output may be implemented may be discussed further in PCT Application WO2018027168 filed on Aug. 4, 2017, and is entitled "TRANSDUCER SYSTEM PROVIDING TACTILE SENSATIONS," the contents of which are incorporated by reference in their entirety.

Figure 4:
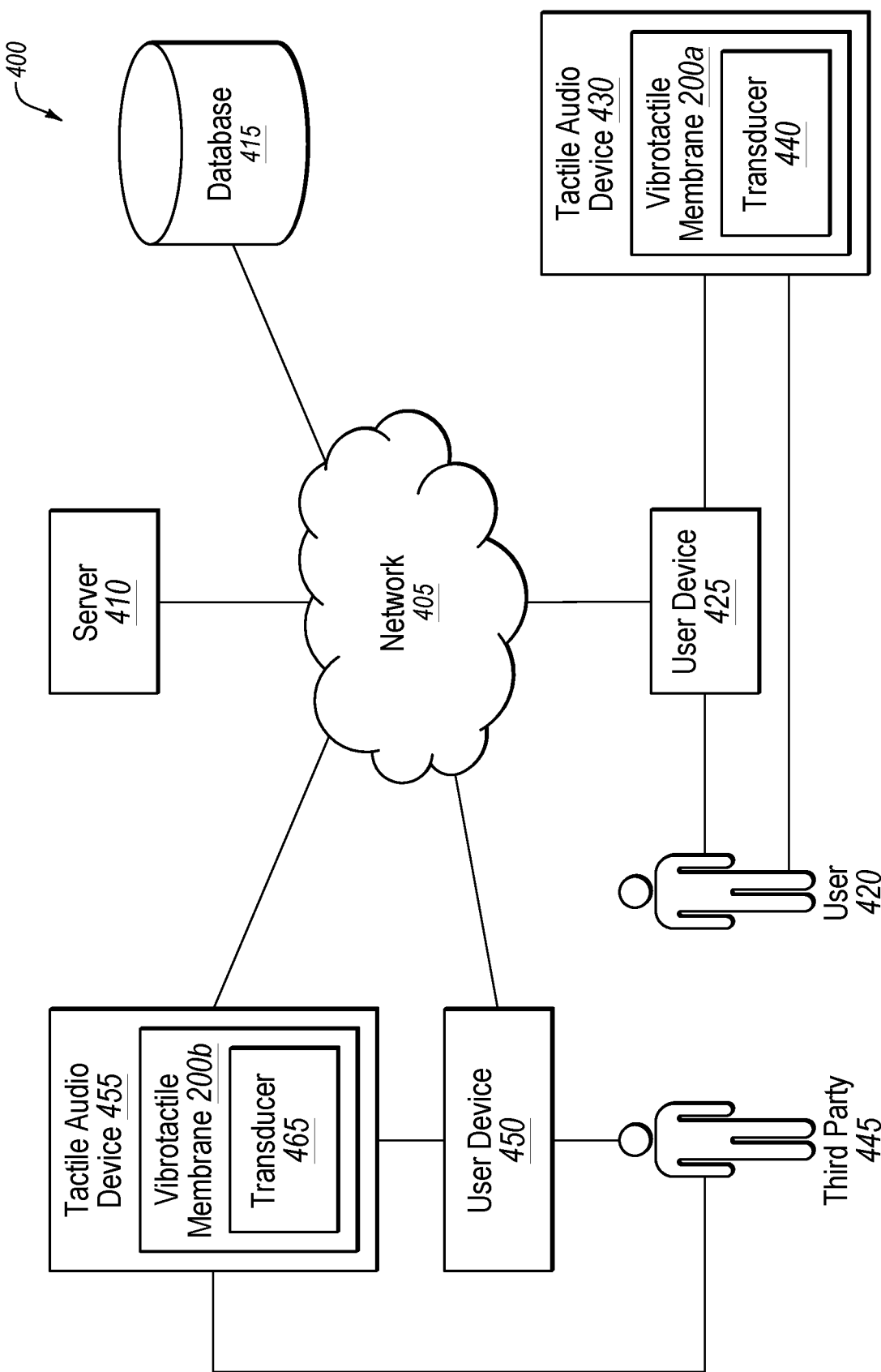
FIG. 4 illustrates an example environment of any of the tactile audio devices of FIGS. 1-3.

FIG. 4 illustrates an example environment 400 of a tactile audio device 430 and/or 455 (which may be similar or comparable to the tactile audio devices of FIGS. 1-3), arranged in accordance with at least one embodiment described in the present disclosure. As illustrated, the environment 400 may include a network 405, a server 410, a database 415, a user 420, a user device 425, a third-party 445, a third-party user device 450, and a tactile audio device 455. In these and other embodiments, the tactile audio device 455 may include a vibrotactile membrane (VTM) 200a and a transducer 440, and the tactile audio device 455 may include a vibrotactile membrane (VTM) 200b and a transducer 465. The VTM 200a and the VTM 200b may be the same as or similar to the VTM 200 discussed with respect to FIGS. 1-3. The transducer 440 and the transducer 465 may also be the same as or similar to the transducer 20 of FIGS. 1-3.

FIG. 4 may be utilized to describe operation of various components of the environment 400 in relation to each other. For example, the network 405 may provide a communication pathway between various components of the environment 400. In this manner, the network 405 may serve as a communication bridge between any of: the user 420, the user device 425, the tactile audio device 430, the third-party 445, the third-party user device 450, the tactile audio device 455, the server 410, the database 415, and/or any combinations thereof.

In some embodiments, a tactile audio response may be personalized by the user device 425 according to preferences of the user 420. In such embodiments, the user device 425 may obtain tactile audio data for implementing the tactile audio response in at least two ways: generating tactile audio data and/or acquiring tactile audio data. For example, to acquire the tactile audio data, the user device 425 may request tactile audio data from another source, such as the server 410 and/or the third-party user device 450. In these and other embodiments, the tactile audio data may have already been generated by the server 410 and/or may be accessible at the third-party user device 450. In these and other embodiments in which the tactile audio data has already been generated by the server 410, the server 410 may personalize the tactile audio data according to preferences of the user 420. After receipt of the request from the user device 425, the server 410 and/or the third-party user device 450 may send the tactile audio data to the user device 425.

With respect to generating the tactile audio data, the user device 425 may request or otherwise obtain audio data stored in any of the database 415, the server 410, and/or the third-party user device 450. Additionally or alternatively, the audio data may be accessed on the user device 425, if, for example, already downloaded or otherwise accessible. After the audio data is obtained, the audio data may be processed and a corresponding tactile audio response may be generated that is personalized to the user 420. Examples of such audio processing methods are described in greater detail below in conjunction with FIGS. 5-10B.

After the tactile audio data is obtained by the user device 425, the tactile audio data may be sent to or otherwise accessed by the tactile audio device 430. Based on the tactile audio data, the tactile audio device 430 may reproduce the tactile audio response described in the tactile audio data to the user 420. Examples of such tactile audio response reproduction may be described in greater detail with reference to FIGS. 5-8.

In some embodiments, the server 410 may generate the tactile audio data. In these or other embodiments, the tactile audio response may be based on the audio data and/or user preferences of the user 420. As discussed above, generation of the tactile audio response based on user preferences may occur in response to a user request from the user 420 via the user device 425. For generation of the tactile audio data based on the audio data, the server 410 may perform audio processing methods described in greater detail below with reference to FIGS. 6 and 9-10B. To perform the audio processing, the server 410 may request audio data stored in any of the database 415 and the third-party user device 450. Additionally or alternatively, the audio data may be accessed on the server 410, if, for example, already stored or otherwise accessible. After the audio data is obtained, the audio data may be processed and a corresponding tactile audio response may be generated that is personalized based on the audio data.

The network 405 may include a wired network, a wireless network, or any combination thereof. The network 405 may include any suitable topology, configuration or configurations including a star configuration, token ring configuration, or other configurations. The network 405 may include a local area network (LAN), a wide area network (WAN) (e.g., the Internet), DECT ULE, and/or other interconnected data paths across which multiple devices may communicate. In some embodiments, the network 405 may include a peer-to-peer network. The network 405 may also be coupled to or include portions of a telecommunications network that may enable communication of data in a variety of different communication protocols. In some embodiments, the network 405 includes BLUETOOTH® communication networks (e.g., MESH Bluetooth) and/or cellular communication networks for sending and receiving data including via short messaging service (SMS), multimedia messaging service (MMS), hypertext transfer protocol (HTTP), direct data connection, wireless application protocol (WAP), e-mail, or the like. Further, the network 405 may include WiFi, NFC, LTE, LTE-Advanced, ZigBee®, LoRA®—a wireless technology developed to enable low data rate communications to be made over long distances by sensors and actuators for machine to machine communication and internet of things (IoT) applications—wireless USB, or any other such wireless technology.

The server 410 may include a processor-based computing device. For example, the server 410 may include a hardware server or another processor-based computing device configured to function as a server. The server 410 may include memory and network communication capabilities.

The database 415 may include anything configured to store audio data, permit the re-transmission of audio data, or is otherwise linked to audio data. For example, the database 415 may include a server, an internet site, a streaming service/subscription library (e.g., Amazon Prime Music®, Spotify®, Pandora®, Apple Music®, etc.), an online/electronic library (e.g., YouTube®, etc.), a blog, a social media page, analog/digital radio station, a satellite radio station, and the like.

The user device 425 and the third-party user device 450 may be the same as or similar to each other. In some embodiments, the user device 425 and/or third-party user device 450 may include a smart phone, a cellphone, a smart watch, a tablet, a laptop, a desktop, a smart home device, a voice-controlled device, a navigation device, a vehicle-installed device, a personal assistant device, and the like. The user device 425 and/or third-party user device 450 may also include any storage therein, including any hardware components for memory storage or corresponding portable/separate storage such as a flash drive, external hard drive, and the like.

The user 420 and the third-party 445 may be the same as or similar to each other. In some embodiments, the user 420 and/or the third-party 445 may include any end users of tactile audio devices such as the tactile audio device 430 and the tactile audio device 455. Example end users may include music fans, artists, musicians, studio professionals, recording personnel, disc jockeys, athletes, students, gamers, virtual reality users, vehicle drivers, and movie theater attendants, without limitation and including other suitable end users.

Figure 5:
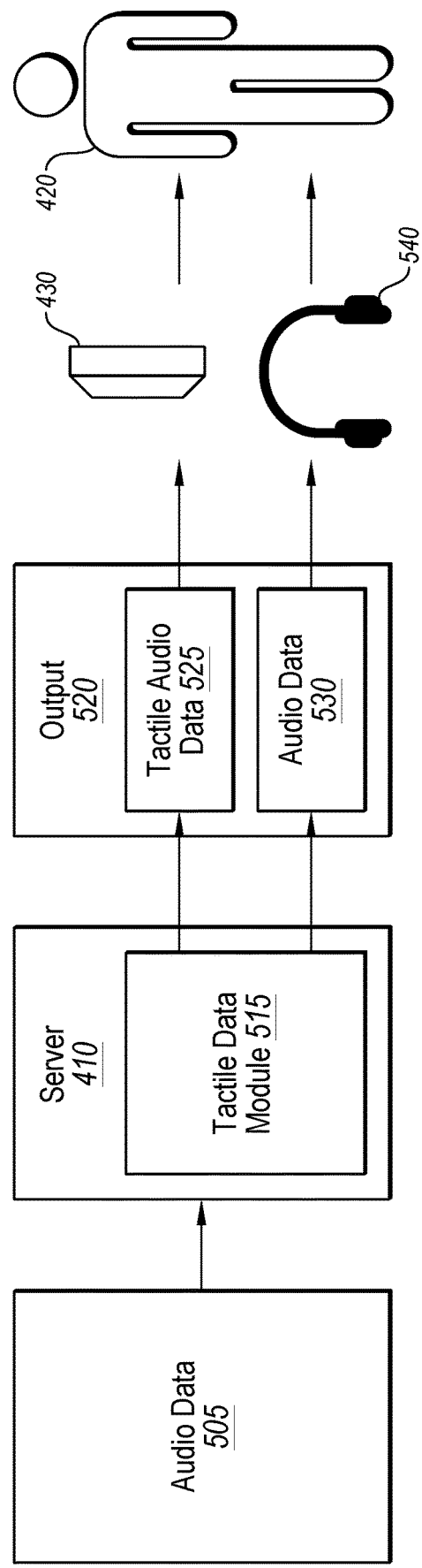
FIG. 5 illustrates an example schematic of an example flow of audio data in relation to tactile audio data.

FIG. 5 illustrates an example schematic 500 of an example data flow to facilitate a tactile audio response arranged in accordance with at least one embodiment described in the present disclosure. As illustrated, the schematic 500 may include audio data 505, the server 410 (which may include a tactile data module 515), output 520 (which may include tactile audio data 525 and audio data 530), the tactile audio device 430, audio reproducer 540, and the user 420.

In some embodiments, the audio data 505 may be received at the server 410. For example, the server 410 may access or request the audio data 505. The audio data 505 may initially be located within a database (e.g., the database 415 of FIG. 4) or within a third-party device (e.g., the third-party user device 450 of FIG. 4) before being requested or accessed by the server 410.

In some embodiments, the server 410 may process the audio data 505 via the tactile data module 515. The audio data 505 may include data representative of any given audio piece or at least a portion thereof. In some embodiments, audio processing by the tactile data module 515 may include splitting the audio piece into constituent components (e.g., audio components). An audio component may include any separable portion of the audio data, such as an audio layer or an audio source, such as a vocal sound, an instrumental sound, an electronic sound, a synthetic sound, a background sound, and/or a channel. For example, a vocal sound may include portions of the audio piece which are sung or otherwise include a human voice. An instrumental sound may include a guitar, piano, drum, violin, saxophone, and any other suitable instrument. An electronic sound may include an instrumental sound such as that generated by electro-mechanical means, including an electronic instrument (e.g., an electric guitar or electric piano). Additionally or alternatively, an electronic sound may include sounds which are computer generated or digitally generated such as the bass beats in the audio piece or the mix of syncopated percussion in techno music or electronic dance music. Synthetic sounds may also include sounds which are not created solely by mechanical means, such as those which are computer generated or digitally altered. Additionally or alternatively, synthetic sounds may include mock sounds (which may be human generated) such as those used in sound effect studios to accompany a separate visual action. Background sounds may include the sound of a crowd, a car driving past, or any other suitable background noise. The background sounds may be real recordings, computer generated, or some combination. A channel may include various timeline tracks of the audio piece and/or be of a certain type of channel (e.g., stereo, centered, surround, left, right, etc.). Additionally or alternatively, the channel may include a single stream of recorded sound with a location in a sound field (e.g., left front loudspeaker).

In some embodiments, the audio data 505 may describe characteristics of the audio piece, including attributes related to audio (e.g., frequency, amplitude, tonal balance, pitch, coloration, rhythm, etc.), attributes related to the audio piece itself (e.g., artist, title, producer, album cover art, genre, lyrics, etc.), or any other attribute related to the audio piece.

In some embodiments, the audio data 505 may include audio attributes in the form of metadata, tags, and the like, which may textually ascribe some identification, meaning, or context to the audio piece.

In some embodiments, after splitting and identifying, the audio processing by the tactile data module 515 may include selecting certain portions of the audio data 505 to be associated with a tactile audio response. For example, a tactile audio response may be associated with selected portions (e.g., audio components) of the audio piece that when reproduced have frequencies below a threshold frequency or within a certain frequency range. The frequencies below the threshold frequency and/or within the frequency range may include frequencies not typically associated with tactile audio responses. Similarly, the frequencies above the threshold frequency and/or frequencies outside of the frequency range may typically be associated with tactile audio responses. Additionally or alternatively, the audio processing by the tactile data module 515 may include affirmatively omitting certain portions of the audio data 505 from being associated with a tactile audio response. For example, the omitted portions from being associated with a tactile audio response may include portions of the audio piece that when reproduced have the frequencies above the threshold frequency and/or the frequencies outside of the frequency range. As another example, certain channels or audio components may be emphasized or de-emphasized, such as a drum track being emphasized while the vocal track may be omitted or de-emphasized.

Additionally or alternatively, processing by the tactile data module 515 may include identifying a problem feature and/or addressing or correcting those problem features. The problem features in the audio data 505 may include noise or other problems. Additionally or alternatively, the problem features in the audio data 505 may include a lack of low frequency audio data (e.g., an audio attribute of some songs pre-1970s), a vocal audio component having low frequencies, wrongly amplified audio in the mastering process, low frequency noise, and/or other features that may be fixed or otherwise affirmatively omitted from being associated with a tactile audio response. In some embodiments, the processing may include addressing or otherwise fixing such identified problems. Following the examples above, noise may be removed or a countering frequency supplied, frequencies outside of a normal range of tactile audio response may have a tactile audio response created for them, and/or various portions of the tactile audio response may be emphasized or de-emphasized to correctly ascribe magnitudes to the various frequency responses. In such embodiments in which the problem features are fixed by the tactile data module 515, the tactile data module 515 may select the problem features (now fixed) to accompany a tactile audio response.

Additionally or alternatively, processing by the tactile data module 515 may include consideration of an environment of the user 420 and/or user preferences of the user 420. For example, in some embodiments, processing by the tactile data module 515 may include consideration of (e.g., compensation for) a noisy environment in which the user 420 is positioned. Additionally or alternatively, processing by the tactile data module 515 may include consideration that the user 420 may enjoy or not enjoy certain tactile audio responses associated with different aspects of the audio piece due to any number of personal preferences, such as frequency or intensity of the tactile audio response (e.g., a first tactile response for electric piano in the Dub step genre, and a second tactile response for bass beats in the Hip-Hop genre). The genre may be indicated in the metadata of the audio piece. Additionally or alternatively, the user 420 may enjoy a certain frequency range more than other frequency ranges. For example, a frequency range may induce vibration of body parts of the user 420 for which the sensation is not enjoyable (e.g., vibration of eye balls). For other frequency ranges, vibration of body parts of the user 420 may be induced in an enjoyable manner (e.g., like a massage). In another example, the user 420 may prefer a certain artist be associated with a certain tactile audio response and another artist be associated with the same or different tactile audio response (e.g., the same tactile audio response for Eric Clapton's guitar and for Jack Johnson's guitar). The artist may be indicated in data associated with the audio piece, such as metadata, tags, RDS data etc. In these or other embodiments, the user may prefer a certain tactile audio response over others and/or that a certain tactile audio response is felt in connection to the audio piece in some instances as opposed to other instances. In such embodiments, the selection and/or omission involved in processing the audio data 505 as performed by the tactile data module 515 may be based on user preferences of the user 420. Examples of such processing of the audio data may be described with greater detail in reference to FIGS. 6-10.

After processing by the tactile data module 515, the tactile data module 515 may generate the output 520, including the tactile audio data 525 and the audio data 530. The tactile audio data 525 as generated may be based on the processing described above. In some embodiments, the audio data 530 may be the same as or similar to the audio data 505, but corresponding to the tactile audio data 525 post-processing by the tactile data module 515. As described above, the tactile data module 515 may generate personalized tactile audio data 525, in which the personalization may be with respect to the user 420 and/or the audio data 505. Personalization of the tactile audio data 525 (whether with respect to the user 420 or the audio data 505 itself) may be discussed in greater detail below in conjunction with FIGS. 6-10.

In some embodiments, the tactile audio device 430 may reproduce a tactile audio response described by the tactile audio data 525 to the user 420. For example, the VTM 200a of the tactile audio device 430 may transfer the vibrations described in the tactile audio data 525 to the user 420. In these and other embodiments, the audio reproducer 540 may reproduce the audio piece described by the audio data 530 of the output 520 to the user 420. Examples of the audio reproducer 540 may include headphones, external speakers, portable speakers, wired speakers, wireless speakers, or any other suitable speakers for reproducing audio, including a speaker for any of: a stereo system, a theater sound system, a general sound system, a smart sound system, a smart home device, a vehicle audio system, a smart phone, a cellphone, a smart watch, a tablet, a laptop, a desktop, and the like. In these and other embodiments, the tactile audio data 525 and the audio data 530 may be synchronized such that as the tactile audio device 430 reproduces the tactile audio response and the audio reproducer 540 reproduces the audio piece, the tactile audio response of the audio piece and the audio piece are experienced by the user 420 in sync. In some embodiments, such an embodiment may utilize electronic communication between the tactile audio device 430 and the audio reproducer 540 such that the two devices operate together based on a timing signal or some other communication.

For each of the methods illustrated in FIGS. 6-10, modifications, additions, or omissions may be made to the methods without departing from the scope of the present disclosure. For example, the operations of the methods may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments. Additionally, for the methods of FIGS. 6-10, the methods may be performed by any suitable system, apparatus or device. For example, any of the components illustrated in FIGS. 1-5 or combinations thereof may perform the methods.

Figure 6:
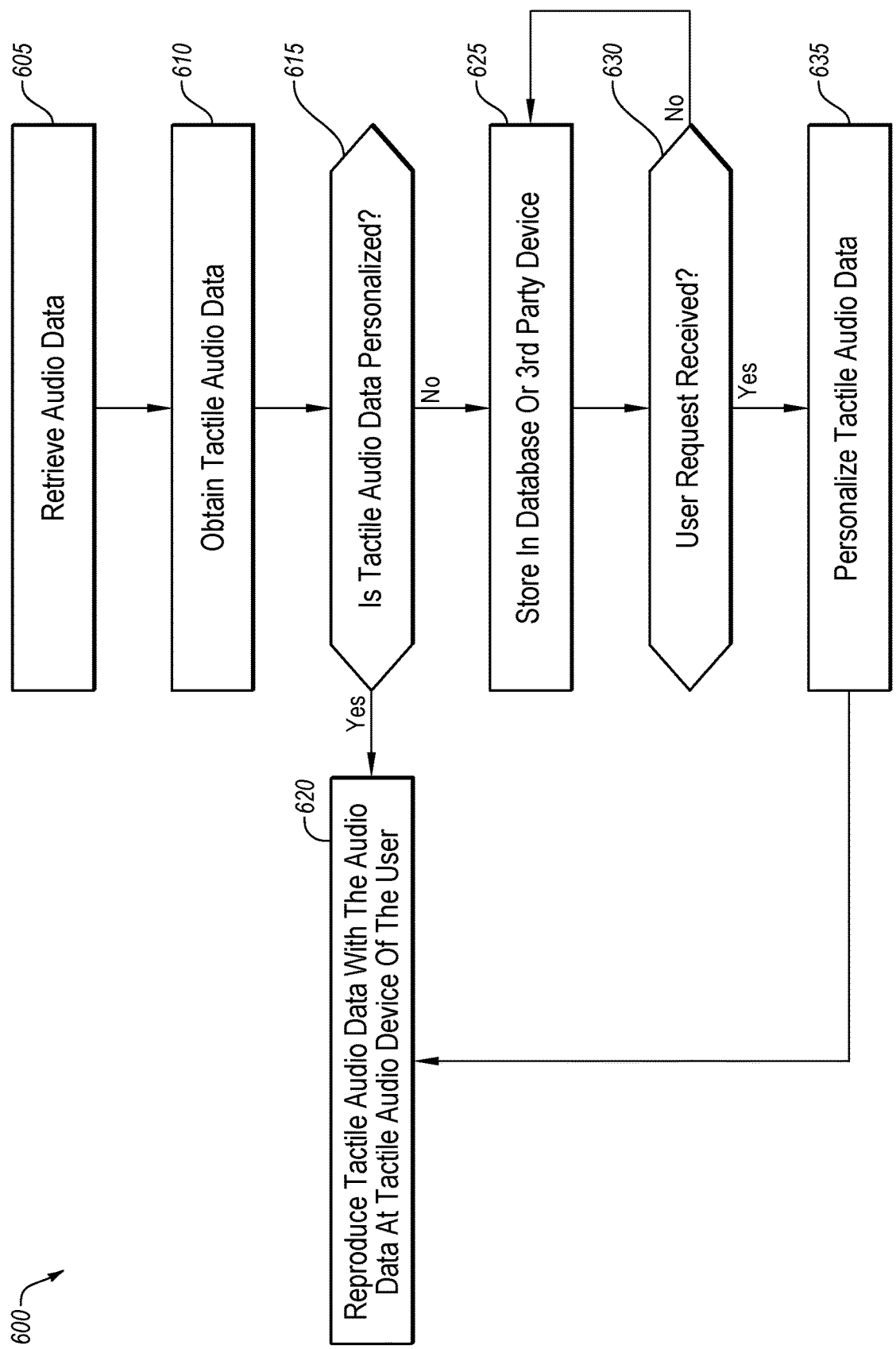
FIG. 6 illustrates a flow diagram of an example method of reproducing personalized tactile audio data.

FIG. 6 illustrates an example flow diagram of a method 600 of reproducing personalized tactile audio data arranged in accordance with at least one embodiment described in the present disclosure.

The method 600 may begin at block 605, in which audio data is retrieved. For example, a user (such as the user 545 of FIG. 5) may request an audio piece via a user device (such as the user device 425 of FIG. 4) of the user. In response to such a request, the user device may retrieve audio data (such as the audio data 505 of FIG. 5) associated with the audio piece. In these and other embodiments, the audio data 505 may be retrieved from storage of the user device, or may be sent to the user device from some location such as a server (e.g., the server 410 of FIG. 4), a database (e.g., the database 415 of FIG. 4), or a third-party user device (e.g., the third-party user device 450 of FIG. 4). Additionally or alternatively to the user requesting and/or retrieving the audio data, a server (e.g., the server 410 of FIG. 4) may retrieve the audio data by requesting from or accessing some location such as storage within the server, the database, or the third-party user device.

At block 610, tactile audio data may be obtained. For example, the user device and/or the server may obtain the tactile audio data (e.g., the tactile audio data 525 of FIG. 5). In some embodiments, depending on the application, the tactile audio data may be generated or acquired. In some embodiments, if the server performs the retrieval at block 605, then the tactile audio data may be generated, for example by a tactile data module. In other embodiments, if the user device performs the retrieval at block 605, then the tactile audio data may be acquired and/or generated. In some embodiments in which the user device acquires the tactile audio data, the tactile audio data may have already been generated by the tactile data module. Additionally or alternatively, in some embodiments in which the user device generates the tactile audio data, the tactile audio data may be generated "on the fly" (e.g., upon user request) if the tactile audio data was not already generated by the tactile data module or is otherwise inaccessible to the user device.

In some embodiments, when generating tactile audio data, the server may generate multiple iterations or versions of the tactile audio data for a single audio piece. For example, if the audio piece is a song, a first version of the tactile audio data may emphasize audio frequencies below 100 Hz and de-emphasize audio frequencies from 100 Hz to 150 Hz, a second version of the tactile audio data may de-emphasize audio frequencies below 25 Hz and/or remove any tactile audio response for a vocal track, and a third version of the tactile audio data may include shifted audio frequencies in which the shifted audio frequencies may be offset from frequencies in other versions of the tactile audio data such as the first version and the second version.

At block 615, a determination may be made whether or not the tactile audio data is personalized to the user. Personalization of the tactile audio data may include personalization of the tactile audio data to the user and/or to the actual audio data. The tactile audio data may be personalized for the user based on any of a user preference, user feedback, a user request, and/or any other suitable user input or user response. Additionally or alternatively, the audio data may be personalized to the actual audio data. For example, if the audio data has one or more problem features, the tactile audio data may be personalized to the audio data to address the problem features. If the tactile audio data is determined to be personalized for the user, then the method 600 may proceed to block 620. If the tactile audio data is determined not to be personalized for the user, then the method 600 may proceed to block 625. In some embodiments, the tactile audio data utilized in block 625 may include the tactile audio data that is based on the audio data of the block 605 without regard to the user.

At block 625, the tactile audio data not personalized to the user may be stored in a database (such as the database 415 of FIG. 4), a server (such as the server 410 of FIG. 4) or a third-party device (such as third-party user device 450). In some embodiments, the stored tactile audio data may be stored such that it may be accessible to a requesting device (such as the process described with reference to block 610). In some embodiments, the tactile audio data may be stored in conjunction with or as part of the audio data. For example, the tactile audio data may be embedded in the audio data as part of the audio data. As another example, the audio data may include a pointer that identifies the tactile audio data such that when the audio data is accessed and/or read the pointer directs an electronic device to the tactile audio data. In some embodiments, the stored tactile audio data may be stored indefinitely, or may have an expiration such that if the tactile audio data is not accessed for a certain period of time or is accessed below a threshold amount, the tactile audio data may be deleted.

At block 630, a determination may be made whether a user request is received for the tactile audio data stored in the database, server, or third-party device. In some embodiments, the user request may include user preferences, user search queries, user settings, user ratings, user reviews, user profile updates, etc. In some embodiments, such user preferences, user search queries, user settings, user ratings, user reviews, user profile updates, etc. may be utilized in determining which of multiple versions of tactile audio data associated with the audio piece is to be retrieved for the user. For example, the user request may identify a particular style or type of tactile audio data the user prefers and the version of the tactile audio data that most closely aligns with that preferred style may be returned in response to the user request. If no such request is received, the method 600 may return to the block 625 to continue to monitor for user requests. If a user request is received, the method 600 may proceed to block 635.

At block 635, the requested tactile audio data may be personalized for the user. For example, a user may send a request for the tactile audio data, which may be personalized for an associated audio piece but may not be personalized for the user. In these and other embodiments, the tactile audio data may be modified according to any of a user preference, user feedback, a user request, and any other suitable user input or user response. For example, the user device may adjust one or more parameters or aspects of the tactile audio data. Additionally or alternatively, the tactile audio data may not be modified. For example, if the tactile audio data is already configured or is otherwise in a manner how the user would prefer, then no modifications to the tactile audio data may be undertaken. As another example, multiple iterations of the tactile audio data may be stored and the user request may facilitate selection of one iteration over another such that the selected iteration is personalized to the user. In some embodiments, to be considered personalized to the user, a user request from the user may be a determining factor; further, no modification to the tactile audio data may be needed. In other embodiments, personalization of the tactile audio data to the user may involve modifications to the tactile audio data as preferred by the user. After personalization at block 635, the method 600 may proceed to the block 620.

At block 620, the personalized tactile audio data may be reproduced with the audio data at the tactile audio device of the user. For example, the tactile audio device may reproduce the tactile audio data to the user (e.g., the audio reproducer 540 may reproduce the audio data 530 to the user 420). In some embodiments, the tactile audio device and the audio reproducer may be synced together such that the reproduction of both the tactile audio data and the audio data are synchronized.

Figure 7:
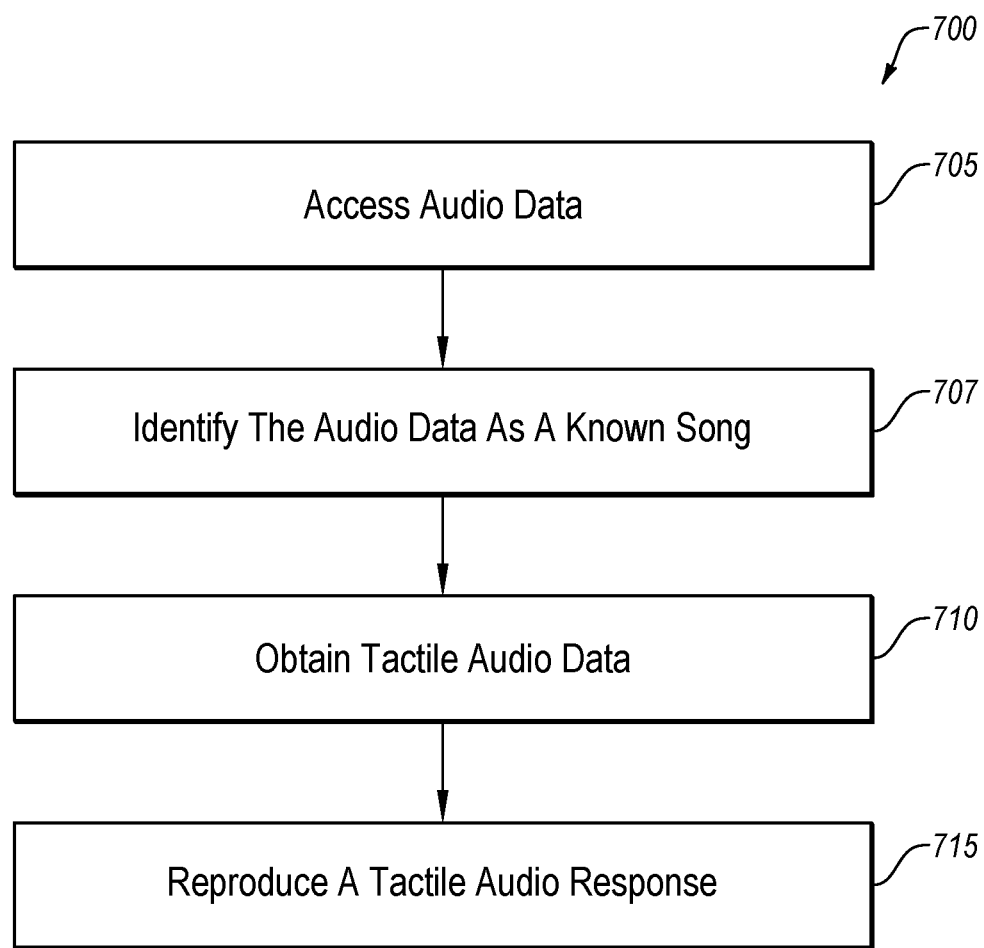
FIG. 7 is a flow diagram of an example method of reproducing a tactile audio response.

FIG. 7 illustrates a flow diagram of a method 700 of reproducing a tactile audio response. In FIG. 7, the method 700 as illustrated may be from the perspective of a user device, such as the user device 425 of FIG. 4.

The method 700 may begin at block 705, in which audio data may be accessed. For example, a user device (such as the user device 425 of FIG. 4) may access audio data (such as the audio data 505 of FIG. 5). In some embodiments, to access the audio data, the user may utilize the user device to request that the audio data be sent to the user device. For example, the user device may stream music from a server, may download an mp3, or may otherwise access audio data.

At block 707, audio data (e.g., the audio data 505 of FIG. 5) may be identified as a known song. For example, the identifying of the audio data may include an iterative process or a machine learning process as performable by a user device (e.g., the user device 425). Additionally or alternatively, the identifying at block 707 may include accessing metadata associated with the audio data to identify the known song. For example, the metadata may include textual information or identification information, such as genre, artist, album title, album cover description, title, record label, song durations, year of release, track list, and the like. Additionally or alternatively, the identifying at block 707 may include obtaining a waveform associated with the audio data to be used in identification of the known song. For example, spectral peaks of the waveform may be analyzed for similarity against known songs (e.g., as stored in a database such as the database 445 of FIG. 4). In some embodiments, obtaining the waveform may include sampling the audio data. For example, by sampling the audio data, a time-domain frequency of a given audio piece may be obtained, from which a music-fingerprinting process and comparison process may be implemented. In these or other embodiments, Discrete Fourier Transform (DFT) methodologies may be employed. DFT algorithms may include Fast Fourier Transform (FFT) algorithms such as the Cooley-Tukey algorithm. Other algorithms may be used depending on the coding language (e.g., FFTW, EigenFFT, JTransform, Numpy, Ruby-FFTW3, etc.). Additionally or alternatively, the identifying at block 707 may include identifying RDS data associated with the audio data, including a title and an artist for the known song.

At block 710, tactile audio data may be obtained. For example, the user device may obtain the tactile audio data based on the identified known song. In some embodiments, depending on the application, the tactile audio data may be generated or acquired. In some embodiments in which the user device acquires the tactile audio data, the tactile audio data may have already been generated (e.g., by the tactile data module 515). In such an embodiment in which the user device acquires the tactile audio data, the user device may obtain the tactile audio data by acquisition or user request based on the known song. For example, a user request may be sent to a server (e.g., the server 410) or a third party device (e.g., the third-party user device 450). In some embodiments, transmitting the user request to the third-party device for the tactile audio data may include any of an artist or a title of the audio data, and/or a user profile of the user.

Additionally or alternatively, if the user device performs the accessing at block 705, the tactile audio data may also be generated by the user device. For example, the tactile audio data to be associated with the audio data may be generated "on the fly" (e.g., upon user request and/or while the user is listening to the audio of the audio data). In some embodiments, upon accessing the audio data at block 705, a user device may initiate a buffering period during which the tactile audio data may be generated. The buffering period may be on the magnitude of milliseconds or seconds. In these and other embodiments, the user device may also add audio data in a queue, during which tactile audio data may be generated. For example, the user device may download the audio data for an entire album and may add each track in the album to the queue. In some embodiments, the user device may immediately begin reproducing the audio of the audio data and wait to begin reproducing the tactile audio response for the user to experience until a threshold amount of tactile audio data has been generated. For example, the user may be provided with five or ten seconds of audio without tactile audio response while the tactile audio response data is generated for the near term portion of the audio piece.

At block 715, a tactile audio response may be reproduced. For example, a transducer (such as the transducer 440 of FIG. 4 or the transducer 20 of FIG. 2) may reproduce the tactile audio response of the tactile audio data in conjunction with an audio reproducer (e.g., the audio reproducer 540 of FIG. 5) reproducing the audio of the audio data. In some embodiments, the tactile audio response may be reproduced in a manner personalized to the user. In some embodiments, reproducing the tactile audio response in the manner personalized to the user may be based on a user profile. The user profile may include any compilation of user settings (e.g., user configurations) and/or user preferences, whether expressly indicated so by the user or gleaned from/implied by interactions from the user. For example, the user profile may include "likes," "dislikes," favorites, comments, ratings, reviews, request counts, playlists, stations, frequently played songs/artists, historical viewing/listening data, subscriptions, social media accounts connections (e.g., those that the user is following, those that follow the user), friends, and social media publishings (e.g., tweets, pins, posts, and the like). Additionally or alternatively, the user profile may include a category for which user settings may be defaulted at a same or similar user setting. For example, reproducing the tactile audio response in the manner personalized to the user may include a default tactile audio response tailored for the category of a certain make and/or model vehicle (e.g., all Nissan® Rogue® vehicles). In some embodiments, the user profile may incorporate or learn (e.g., via machine learning, crawling, scraping, connecting profiles, etc.) from other profiles of the user. For example, the user 420 may have a headphone or speaker profile (e.g. Amazon Echo®), or a profile on a music streaming site/application (e.g. Spotify®, Pandora®, Apple Music®, etc.).

Additionally or alternatively, in some embodiments, reproducing the tactile audio response in the manner personalized to the user may be based on the audio data. For example, given the audio data associated with a particular audio piece (e.g., a hip-hop song), the particular audio piece may be reproduced with the tactile audio response in a similar fashion to hip-hop songs that the user has previously given high ratings or favorable feedback (e.g., based on the user profile) while experiencing a tactile audio response. In such a case, the audio data may have indicated in one or more ways (e.g., average frequency, metadata, etc.) that the particular audio piece was a hip-hop song. As another example, the tactile audio response may be personalized to the user based on a particular frequency range that the user has indicated to "feel good" for hip-hop songs. In some embodiments, the user profile may include a user preference for an audio component associated with the audio data.

In some embodiments, the user profile may include user settings, that may determine what types of tactile audio responses should be reproduced to the user (e.g., tactile audio responses in a certain frequency range or that only associate with certain audio components, such as a bass guitar and drums). In some embodiments, the user profile may include default preferences configured to be changed by the user. Additionally or alternatively, the user profile may include weighted user preferences in which the user may rank or prioritize the user preferences. For example, the weighted preferences may determine when to override popular user trends (e.g., when "contradictory to my profile") or when to override personal trends (e.g., when "willing to test brand new tactile audio data").

In another example, the tactile audio response personalized to the user may be based on the audio data, but by way of omission. For example, portions of a given audio piece above some threshold frequency may not "feel good" to the user. Accordingly, any tactile audio response associated with frequencies above the threshold frequency may be suppressed or otherwise omitted. Additionally or alternatively, portions of the audio data may be removed, for example, using a DSP.

In another example, some audio components in the audio data may not "feel good" to the user, for example vocals. Accordingly, in some embodiments, the tactile audio response may not be associated with a vocal track. Additionally or alternatively, a voice removal process may be performed on the audio data prior to generating the tactile audio data, for example, using wavelet-based techniques. Examples of wavelet based techniques may include wavelet transforms such as discrete wavelet transform and continuous wavelet transform. In these or other embodiments, the user may indicate in the user profile various aspects of the audio data that do "feel good" and do not "feel good." Additionally or alternatively, machine learning techniques may be implemented to learn what aspects of the audio data "feel good" and do not "feel good" according to the user.

In some embodiments, reproducing the tactile audio response in the manner personalized to the user may be based on an environment of the user and/or an environment of the tactile audio device. For example, a curve of magnitudes of frequencies in one application (e.g., implemented in a vehicle seat) may not "feel good" to the user or may not result in optimal tactile audio response quality, while the same curve in a different application (e.g., a shirt or backpack) may "feel good" to the user or may result in optimal tactile audio response quality. Any of a variety of factors may contribute to such variations, such as frequency responses of the system (e.g., the vehicle seat vs. the backpack), frequency response of the body of the user in that system, resonance frequencies within the system, etc. In these or other embodiments, for example, a known resonance frequency in a given system may be avoided, omitted, or de-emphasized for tactile responses in the given system. In some embodiments, reproducing the tactile audio response in the manner personalized to the user may be based on an environment of the user and/or an environment of the tactile audio device given certain interactions between the tactile audio response and the environment. For example, the tactile audio response may be reproduced in a first manner for a first environment (e.g., a vehicle) and in a second manner for a second environment (e.g., a backpack), in which the second manner is different from the first manner.

In some embodiments, reproducing the tactile audio response may be synchronized to a reproduction of the audio data. The level of synchronization between the tactile audio response and the audio data may indicate how well the tactile audio response matches with the audio data. For example, signal peaks in the audio data may precisely align with signal peaks in the tactile audio data. In other examples, the signal peaks in the audio data may not precisely align with the signal peaks in the tactile audio data. Misalignment of respective signal peaks may result in a latency effect in which the audio as heard may not seem to match what is felt from the tactile audio response. Some misalignment, mismatch, or latency may be acceptable within a threshold range. For example, latency within the range of about −5 ms to about +15 ms may be considered as an example threshold latency range. Less sensitive users may have an expanded example threshold latency range of about −15 ms to about +30 ms, while more sensitive users may have a smaller example range of threshold latency of about −5 ms to about +5 ms. In these or other embodiments, as latency increases beyond a threshold range of latency, the user may consider the tactile audio response to "feel" worse and worse with increasing departure from the threshold range of latency. In some embodiments, reproducing the tactile audio response in the manner personalized to the user may be based on a level of synchronization and/or a threshold range of latency between the reproduced tactile audio response and the reproduced audio data.

Figure 8:
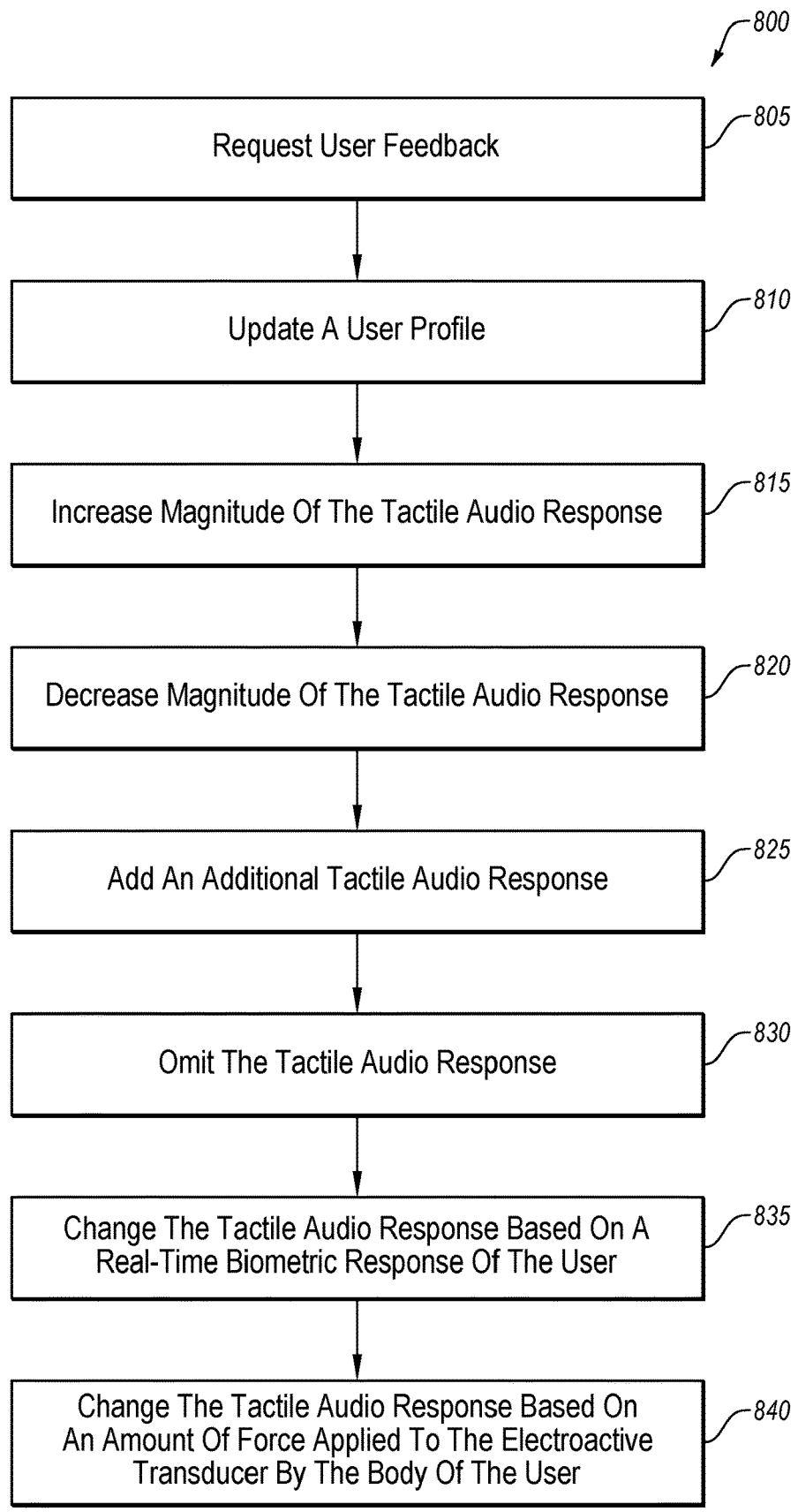
FIG. 8 is a flow diagram of another example method of reproducing a tactile audio response.

FIG. 8 illustrates a flow diagram of a method 800 of reproducing a tactile audio response. Like FIG. 7, the method 800 as illustrated may be from the perspective of a user device, such as the user device 425 of FIG. 4.

The method 800 may begin at block 805, in which user feedback may be requested. For example, user feedback from the user may be requested by the user device regarding the tactile audio response. Feedback may be requested regarding any of a variety of factors associated with the tactile audio response. For example, the user feedback may be associated with a level of synchronization between the tactile audio response and the audio data as reproduced. As another example, the user feedback may be associated with an overall quality of the tactile audio response for a given audio piece. Additionally or alternatively, the user feedback may include a desire or request to test new audio pieces with corresponding tactile audio responses, which the user may then rate and/or review. Such testing may be part of a beta testing process, a quality control process, and/or a user satisfaction/survey process. In these or other embodiments, ratings and reviews by the user (and/or other users) may correspond to a resultant value (e.g., numerical value or popularity) of a given audio piece with a corresponding tactile audio response. Additionally or alternatively, the quality and/or quantity of the ratings and reviews as individually provided, for example by the user, may correspond to a degree of experience, usage, satisfaction, testing ability, etc. of the user.

In some embodiments, the user feedback may be used in conjunction with curating, sorting, or otherwise improving a database of tactile audio data sets. For example, multiple tactile audio data sets may be generated for a given audio piece. As users provide feedback regarding the tactile audio response they experienced, the database may be updated such that, of the multiple potential tactile audio data sets available, the one with the highest reviews may be provided most often. Additionally or alternatively, the profiles of the user providing the reviews may also be provided, such that different styles of generic user profiles may be stored as being related to a given tactile audio data. For example, if a set of users who particularly enjoy drums have frequently given a curve of frequency magnitudes for a tactile audio response a high ranking or positive review, a request for a tactile audio data set from a user with a similar profile (e.g., they particularly enjoy drums) may be responded to with the tactile audio data set that most closely matches the curve of frequency magnitudes.

At block 810, a user profile may be updated. For example, the user profile may be updated by the user or in response to interactions by the user. For example, based on user feedback, the user profile may be updated such that reproduction of a future tactile audio response is personalized based on the user feedback. For instance, during reproduction of a tactile audio response, the user may provide feedback that the tactile audio response does not "feel good." Based on that feedback, the user profile may be updated accordingly such that the same tactile audio response is not again reproduced to the user. Additionally or alternatively, the tactile audio response may be corrected upon receiving the user feedback. For example, the tactile audio response may adjust in some manner or otherwise stop all together (e.g., move to another audio piece) upon receiving the user feedback. In some embodiments, the user profile may visually reflect the user feedback with respect to a given tactile audio data set of a given audio piece (e.g., thumbs up, thumbs down, happy face emoji, sad face emoji, etc.).

In some embodiments, the user profile may be updated based on physical responses of the user. For example, one or more sensors (such as a force sensor) associated with a transducer for transferring the tactile audio response to the user may monitor the proximity of the body of the user to the transducer. For example, application of force to the transducer may be indicative of user preferences because a user may lean back to feel more of the tactile audio response and may lean forward to feel less of the tactile audio response. Additionally or alternatively, the user may apply a tighter fit between the body of the user and the transducer, or the user may apply a looser fit between the body of the user and the transducer. For example, the tightness or looseness of fit between the transducer and the body of the user may be adjusted depending on whether more or less of the tactile audio response is desired. As force applied by the user changes, the sensors associated with the transducer may provide updates to the user profile, e.g., real-time updates of a user preference.

At block 815, a magnitude of at least a portion of the tactile audio response may increase. For example, in some embodiments, the user may enjoy a particular tactile audio response and may wish to feel more (e.g., a greater amount) of the particular tactile audio response. In other embodiments, the user may have, for example, thick skin, greater mass, and/or lower levels of bone-vibration conduction and may desire to have the magnitude of the tactile audio response increased. In these and other embodiments, the user profile may include user preferences regarding a magnitude of the tactile audio response. Additionally or alternatively, the user profile may include a size, weight, height, age, etc., from which an increase in magnitude may be determined.

In some embodiments, reproducing the tactile audio response in the manner personalized to the user may include increasing the magnitude of the tactile audio response associated with at least one portion of the audio data based on the user profile. In some embodiments, increasing the magnitude of the tactile audio response associated with at least one portion of the audio data based on the user profile may include increasing the magnitude of the tactile audio response for a subset of a range of frequencies of the tactile audio response. For example, one subset of a range of frequencies may "feel good" to one user, and another subset of a range of frequencies may "feel good" to another user. The "feel good" subsets of frequencies from the perspective of the user may be selected for reproduction at an increased magnitude relative to other frequencies. As another example, a certain class of type of audio may "feel good" to one user, such as drums or bass guitar such that the magnitude of the bass guitar track of the audio data may have a corresponding tactile response of increased magnitude.

At block 820, a magnitude of the tactile audio response may decrease. The block 820 may be similar or comparable to the block 815 in concept, but may reduce the magnitude of tactile audio response rather than increasing the magnitude of the tactile audio response to be more personalized for the user. For example, in some embodiments, the user may not enjoy a particular tactile audio response and may wish to feel less (e.g., a smaller amount) of the particular tactile audio response. For example, the user may have thin skin, lower mass, and/or greater levels of bone-vibration conduction and may desire to have the magnitude of the tactile audio response decreased. In some embodiments, reproducing the tactile audio response in the manner personalized to the user may include decreasing the magnitude of the tactile audio response associated with at least one portion of the audio data based on the user profile.

At block 825, an additional tactile audio response may be added. For example, a tactile audio response associated with at least one portion of the audio data may be added to the actual tactile audio response experienced by the user based on the user profile. For example, the user may indicate or have previously indicated a favorite type of tactile audio response (e.g., a tactile audio response in a certain frequency range, a tactile audio response associated with a particular instrument, etc.) that may be added. In another example, the user may experience a new or different tactile audio response that is added and may provide user feedback to indicate favorable ratings and/or a request to include the same or a similar tactile audio response in the future. In these or other embodiments, adding the additional tactile audio response may include adding the additional tactile audio data response to a portion of the audio data in a frequency range outside of a normal frequency range of typical tactile audio response. For example, the additional tactile audio response may include sub-bass frequencies (e.g., frequencies of about 20 Hz to about 100 Hz). As another example, the additional tactile audio response may include higher bass frequencies (e.g., frequencies from about 150 Hz to 175 Hz). For example, some music producers may remove any musical components below a threshold frequency which may be above a typical cutoff frequency for tactile audio responses. In these and other embodiments, components of the audio piece that are near (e.g., within 50 Hz) of the utilized cutoff frequency may have a tactile audio response generated despite being outside of a normal frequency range for such tactile audio responses.

At block 830, a tactile audio response may be omitted. For example, a tactile audio response associated with at least one portion of the audio data may be omitted based on the user profile. For example, the user may indicate or have previously indicated a disliked type of tactile audio response (e.g., a tactile audio response in a certain frequency range, a tactile audio response associated with a particular instrument, etc.). In another example, the user may experience a new or different tactile audio response and may provide user feedback to indicate unfavorable ratings and/or a request to not include the same or a similar tactile audio response in the future.

At block 835, the tactile audio response may be changed based on a real-time biometric response of the user. In this manner, reproducing the tactile audio response may be further personalized to the user. In some embodiments, the real-time biometric response of the user may be analyzed with respect to a stored biometric response, such as a historical biometric response stored in the user profile. The stored biometric responses may also be stored with a corresponding state of being of a user at the time the biometric response was evaluated. For example, through input from the user and/or via machine learning techniques, it may be determined that a real-time heart rate in some heart-rate range may correspond to the user being tired. By storing biometric responses and the corresponding state of being for the user (e.g., in the user profile), real-time biometric responses may indicate a real-time state of being for the user. Additionally or alternatively, the real-time biometric response of the user may indicate any of a mood, a stress level, and an energy level of the user. In turn, based on a current state of being for the user, the tactile audio response may be changed. For example, the tactile audio response may be changed to an upbeat or stirring tactical audio response if the biometric response indicates the user is drowsy while driving. In the drowsy driver example, based on the user profile, a proper tactile audio response may be reproduced that has historically energized the user (e.g., typically raises the heart rate of the user above a threshold amount). Other example applications may be implemented when the user is sad, angry, tense, sore, and the like, to counter such states of being. In an example embodiment, the tactile audio device may be used in therapy, rehabilitation, and/or massage treatments, including integration with any equipment thereof (e.g., chairs, tables, beds, etc.). In some embodiments, the biometric response of the user may be measured by a biometric sensor configured to measure any of: a heart rate, a body temperature, a voice pattern, a facial expression, an eye pattern, a vein pattern, muscle tension, and blood flow.

At block 840, the tactile audio response may be changed based on an amount of force applied to the transducer by the body of the user. In this manner, reproducing the tactile audio response may be further personalized to the user. Application of force to the transducer may be indicative of user preferences because a user may lean back to feel more of the tactile audio response and may lean forward to feel less of the tactile audio response. Additionally or alternatively, the user may apply a tighter fit between the body of the user and the transducer, or the user may apply a looser fit between the body of the user and the transducer. For example, the tightness or looseness of fit between the transducer and the body of the user may be adjusted depending on whether more or less of the tactile audio response is desired. As the force applied against the transducer decreases, it may be determined that the user wants less of the tactile audio response and/or that the user does not enjoy the tactile audio response. Similarly, as the force applied against the transducer increases, it may be determined that the user wants more of the tactile audio response and/or that the user enjoys the tactile audio response. In these or other embodiments, the tactile audio response may be changed in response to the force (or change in force) applied to the transducer by the body of the user. Additionally or alternatively, the user profile of the user may be updated to reflect the enjoyment or lack thereof of the user.

In some embodiments, the amount of force applied to the transducer by the body of the user may be analyzed with respect to stored force data, for example, force data stored in the user profile. Additionally or alternatively, the amount of force applied to the transducer by the body of the user may be used to update the user profile with a preference for the tactile audio response based on the amount of force being above a threshold. For example, through input from the user and/or via machine learning techniques, it may be determined that an applied force in some force range may correspond to the user enjoying the tactile audio response. By storing force data and the corresponding level of satisfaction for the user, as stored in the user profile, real-time force data may indicate a real-time level of satisfaction for the user. As another example, based on the user profile, the real-time force data applied to the transducer by the user may indicate any of an engagement level, a satisfaction level, and a comfort level. In turn, based on a current state of being for the user, the tactile audio response may be changed. For example, the tactile audio response may be changed by increasing the magnitude of the tactile audio response if the force applied to the transducer exceeds some threshold force, indicating the user enjoys the tactile audio response. Similarly, the tactile audio response may be changed by decreasing the magnitude of the tactile audio response if the force applied to the transducer dips below some threshold force, indicating the user does not enjoy the tactile audio response. In these examples, based on the user profile, a proper tactile audio response may be reproduced that has historically been enjoyable to the user based on historical force data in the user profile.

In some embodiments, the stored force data, as applied by the user to the transducer, may indicate to an advertisement agency a level of engagement with an advertisement. For example, after completion of a tactile audio response, an advertisement may begin that incorporates a tactile audio response to enhance advertisement effectiveness. A change in force during the advertisement as applied by the user may indicate whether the advertisement was more, less, or equally engaging as the tactile audio response associated with non-advertisement. Additionally or alternatively, the advertisement may be rated according to the force applied by the user independent of any non-advertisement tactile audio response.

Figure 9:
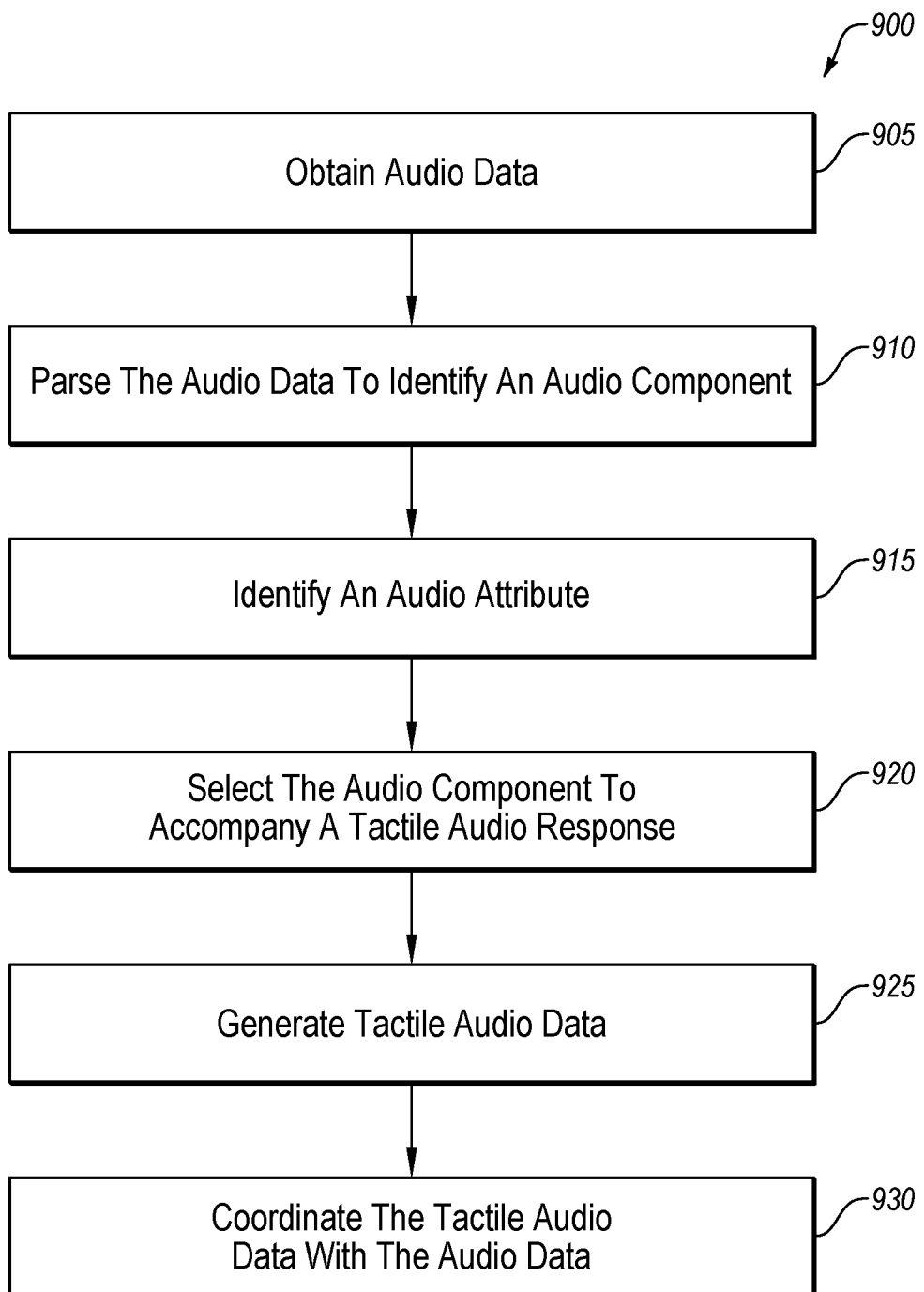
FIG. 9 is a flow diagram of an example method of generating and coordinating tactile audio data.

FIG. 9 illustrates a flow diagram of a method 900 of generating and coordinating tactile audio data, such as tactile audio data 525 of FIG. 5. In FIG. 9, the method 900 as illustrated may be from the perspective of a server, such as the server 410 of FIG. 4, which is configured to generate tactile audio data for an audio piece.

The method 900 may begin at block 905, in which audio data (such as the audio data 505 of FIG. 5) may be obtained. For example, a server (such as the server 410 of FIG. 4) may obtain the audio data. In some embodiments, the server may send a request to a database (e.g., the database 415 of FIG. 4) or a third party device (e.g., the third-party user device 450 of FIG. 4). The server request may include a particular query for audio data, such as a request for a specific song based on a title and artist name. Additionally or alternatively, the server may access memory or other storage within the server itself for audio data stored therein or otherwise accessible in the server.

At block 910, the audio data may be parsed to identify one or more audio components in the audio data. The audio component may be the same as or similar to the audio component discussed with respect to the audio data 505 of FIG. 5. The audio component may include an audio layer (e.g., a vocal layer) or an audio source (e.g., an instrumental sound). In some embodiments, parsing the audio data to identify an audio component may include splitting an audio piece according to its constituent audio components. For example, when parsed, the audio components may include an audio layer or an audio source that may include a vocal sound, an instrumental sound, an electronic sound, a synthetic sound, a background sound, a channel, etc.

At block 915, an audio attribute of the audio data and/or the audio components may be identified. In these and other embodiments, the audio attributes may include attributes related to the audio of the audio piece, such as frequency, amplitude, tonal balance, pitch, coloration, rhythm, and the like. Additionally or alternatively, the audio attributes may textually ascribe some identification, meaning, or context to the audio piece (e.g., title, artist, album art, genre, etc.). In these and other embodiments, the audio attributes may be stored or otherwise associated with the audio data via a tag, metadata, etc. Additionally or alternatively, the audio attributes may be identified via waveform analysis, frequency spectral comparison, or any other audio analysis technique.

At block 920, the audio component may be selected to accompany a tactile audio response (e.g., the tactile audio response 525 of FIG. 5). The tactile audio response may be the same as or similar to the tactile audio response discussed in the previous figures. In some embodiments, selecting the audio component to accompany the tactile audio response may be based on the audio attribute of the audio component. For example, selecting the audio component may include selecting a first audio component having a frequency below a threshold frequency and excluding a second audio component having a frequency above the threshold frequency. For instance, the threshold frequency may be about 100 Hz, about 150 Hz, about 200 Hz, or some other suitable frequency. Additionally or alternatively, selecting the audio component may include selecting the audio component outside of a typical frequency range for a typical tactile audio response. For example, the frequency range for typical tactile audio responses may include frequencies between about 5 Hz to 200 Hz, although it may include up to about 500 Hz. In some embodiments, the selecting may include selecting an audio component between about 200 Hz and about 20 Hz, which may or may not be outside common tactile audio response frequencies. As another example, the audio component may include a drum track of the audio data of the audio piece, a subwoofer channel of the audio data, etc. that may be selected.

At block 925, tactile audio data may be generated. In some embodiments, the tactile audio data may describe the tactile audio response for the selected audio component, and may be specific to the audio data. In these or other embodiments, the tactile audio data specific to the audio data may include a first set of tactile audio data specific to a first audio component. For example, the first set of tactile audio data may be specifically for the bass guitar in a given audio piece. The first set of tactile audio data may include executable instructions to reproduce a tactile audio response for the bass guitar at, for example, about 50 Hz. Additionally or alternatively, the tactile audio data specific to the audio data may include a second set of tactile audio data specific to a second audio component in the given audio piece. The first audio component may be different from the second audio component. For example, the second set of tactile audio data may be specifically for the percussion in the given audio piece. The second set of tactile audio data may include executable instructions to reproduce the tactile audio response for the percussion at, for example, also about 50 Hz. In these and other embodiments, the first set and the second set of tactile audio data may be combined into a single output, for example, by adding the two frequency responses or any other combinatorial technique.

In some embodiments, the first set of tactile audio data may be distinct from the second set of tactile audio data in the tactile audio data. Using the above example, the first set of tactile audio data may include executable instructions to reproduce a tactile audio response for the bass guitar at, for example, about 50 Hz. The second set of tactile audio data may include executable instructions to reproduce the tactile audio response for the percussion at, for example, about 120 Hz. In this manner, the tactile audio data, including distinct portions that make up the tactile audio data, may be generated in a personalized manner to the audio data and its constituent audio components.

In these and other embodiments, the instructions for the various frequencies and/or other various audio components may include an instruction regarding the amplitude of the tactile audio response associated with the various sets of tactile audio response. For example, continuing the example from above, the tactile audio response for the bass guitar may have instructions for a first magnitude and the tactile audio response for the percussion may have instructions for a second magnitude greater than the first magnitude.

In these and other embodiments, the tactile audio data may be configured to instruct an electroactive transducer, such as transducer 440 of FIG. 4, to transfer the tactile audio response described in the tactile audio data to a body of the user. In some embodiments, the instructions may be computer-executable instructions and may include, for example, instructions and data configured to cause a processor to perform a certain operation or group of operations as described in the present disclosure, including for example initiating the transfer of the tactile audio response to the body of the user via a transducer and/or membranes.

At block 930, the tactile audio data may be coordinated with the audio data. For example, a server (e.g., the server 410 of FIG. 4) may help coordinate the tactile audio data with the audio data (e.g., using the tactile data module 515 of FIG. 5). In some embodiments, coordinating may include coordinating the tactile audio data of the selected audio component with the audio data of the selected audio component. For example, spectral peaks of the audio data and the tactile audio data may be used to coordinate, e.g., by aligning respective peaks. In another example, time markers may be used for coordinating, including the alignment of respective time markers in the audio data and the tactile audio data.

In some embodiments, coordinating may include synchronizing the tactile audio data and the audio data to be within a threshold range of latency. The level of synchronization between the tactile audio response and the audio data may indicate how well the tactile audio response matches with the audio data. For example, signal peaks in the audio data may precisely align with signal peaks in the tactile audio data. In other examples, the signal peaks in the audio data may not precisely align with the signal peaks in the tactile audio data. Misalignment of respective signal peaks may result in a latency effect in which the audio as heard may not seem to match what is felt from the tactile audio response. Some misalignment, mismatch, or latency may be acceptable within a threshold range. For example, latency within the range of about −5 ms to about +15 ms may be considered as an example threshold latency range, at least for most users. Less sensitive users may have an expanded example threshold latency range of about −15 ms to about +30 ms, while more sensitive users may have a smaller example range of threshold latency about −5 ms to about +5 ms. In these or other embodiments, as latency increases beyond a threshold range of latency, the user may consider the tactile audio response to "feel" worse and worse with increasing departure from the threshold range of latency. In some embodiments, coordinating may include synchronizing the tactile audio data and the audio data, for example, within a threshold range of latency.

Figure 10:
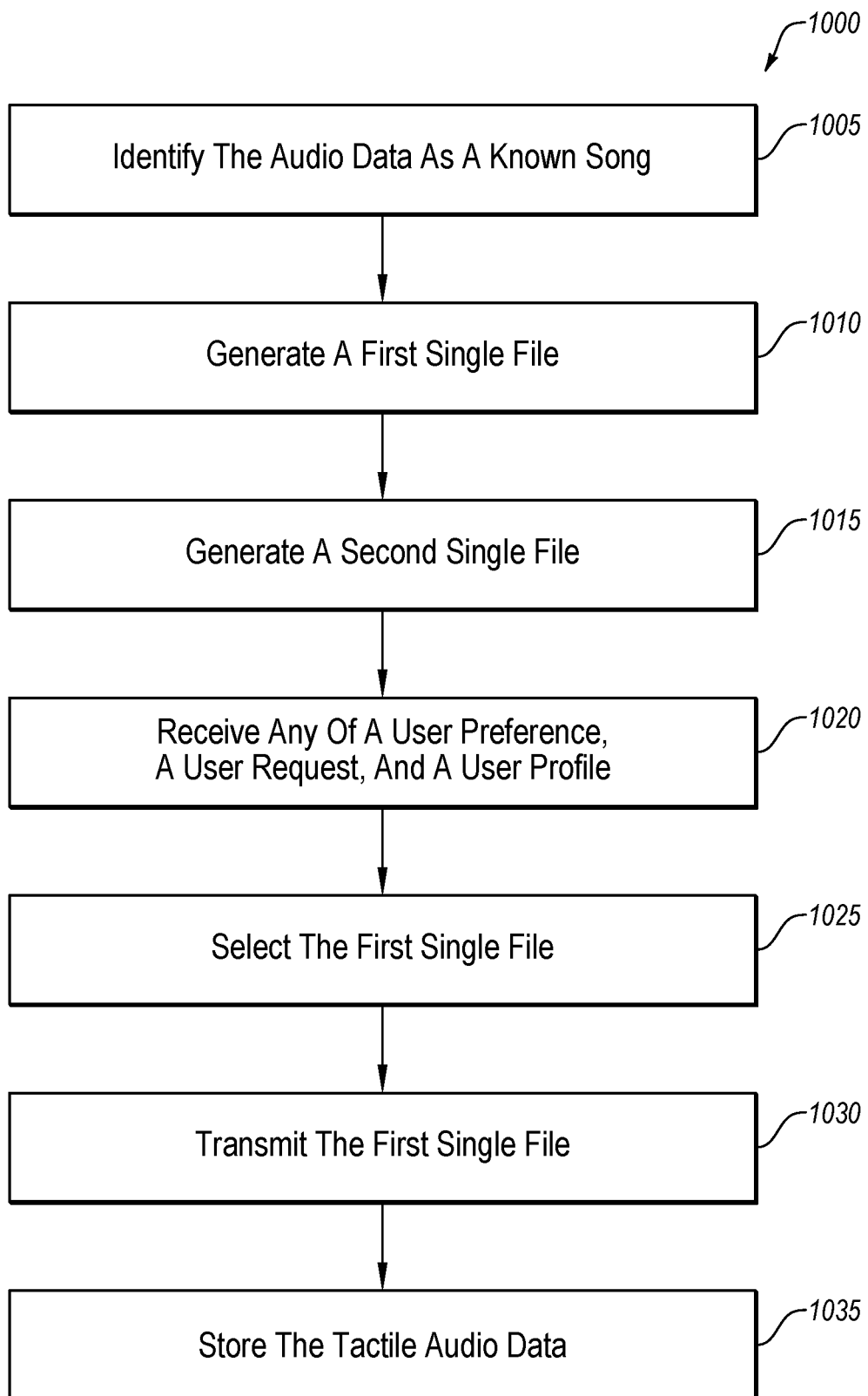
FIG. 10 is a flow diagram of another example method of generating and coordinating tactile audio data, all in accordance with at least one embodiment described in the present disclosure.

FIG. 10 illustrates a flow diagram of a method 1000 of generating and coordinating tactile audio data, such as the tactile audio data 525 of FIG. 5. Like FIG. 9, the method 1000 as illustrated may be from the perspective of a server, such as the server 410 of FIG. 4. Further, the method 1000 may include various details and alternatives of FIG. 9.

The method 1000 may begin at block 1005, in which audio data (e.g., audio data 505) may be identified as a known song. For example, the identifying may include accessing metadata associated with the audio data to identify the known song. For example, the metadata may include textual information or identification information, such as genre, artist, album title, album cover description, title, record label, song durations, year, track list, and the like. Additionally or alternatively, the identifying at block 1005 may include obtaining a waveform associated with the audio data to identify the known song. After being obtained, for example, spectral peaks may be analyzed for similarity against known songs (e.g., as stored in a database such as the database 445 of FIG. 4). The obtaining may include accessing waveform data or may include sampling. For example, by sampling audio data, a time-domain frequency of a given audio piece may be obtained, from which a music-fingerprinting process and comparison process may be implemented. In these or other embodiments, Discrete Fourier Transform (DFT) methodologies may be employed. DFT algorithms may include Fast Fourier Transform (FFT) algorithms such as the Cooley-Tukey algorithm. Other algorithms may be used depending on the coding language (e.g., FFTW, EigenFFT, JTransform, Numpy, Ruby-FFTW3, etc.). Additionally or alternatively, the identifying at block 1005 may include identifying RDS data associated with the audio data, including a title and an artist for the known song.

At block 1010, a first single file may be generated. For example, following a process similar or comparable to the method 900 of FIG. 9, a tactile audio response may be generated with audio data identified at block 1005 of the known song. In these and other embodiments, generating and coordinating the tactile audio data (such as generating at block 925 and coordinating at block 930 of FIG. 9) may include generating the first single file that includes both the tactile audio data and the audio data in the single file that may be accessed and/or otherwise retrieved as a single file.

At block 1015, a second single file may be generated. The block 1015 may be similar or comparable to the block 1010, except the tactile audio data may be different although being generated for the same known song. The second single file may include the audio data and different tactile audio data such that the tactile audio response of the tactile audio data in the first single file is different from the tactile audio response of the different tactile audio data in the second single file. For example, given a particular audio piece as described in a given audio data, multiple versions (e.g., a first single file, a second single file, etc.) of the same audio piece may be generated. Each single file may include different tactile responses as described in different tactile audio data sets, each of which may correspond to the same underlying audio data. For instance, the first single file may be a "guitar lover" version of "Song A" having a tactile audio response associated with at least the guitar in "Song A." The second single file may be a "drummer maniac" version of "Song A" having a tactile audio response associated with at least the drums in "Song A." In this example, the audio data for "Song A" may be the same in both the first single file and the second single file.

At block 1020, a user preference, a user request, and/or a user profile may be received. For example, any of the user preference, the user request, and/or the user profile may be received in conjunction with a request for the audio piece and/or an associated tactile audio response.

At block 1025, the first single file may be selected. For example, based on the receiving at block 1020, the first single file may be selected, instead of the second single file, as responsive to any of the received user preference, user request, and/or user profile. For example, the first single file may be more consistent with the user profile of the requesting user. The selection of the first file may be based on any of a variety of factors that may be included in the request and/or stored at a server hosting the first single file.

For example, the request may include biometric data. Based on a current state of being for the user as determined by the biometric data, the first single file may be selected. For instance, the first single file may be selected due to the first single file being an upbeat or stirring tactical audio response if the biometric response indicates the user is drowsy while driving. In the drowsy driver example, based on the user profile, the selected first single file may be an appropriate tactile audio response that has historically energized the user. In these or other embodiments, the selected first single file may be an appropriate tactile audio response that is similar to those that have historically energized the user, according to the user profile. Other example applications may be implemented when the user is sad, angry, tense, sore, and the like to counter such states of being.

As another example, the request may include a user profile with force data. Based on the force data, the first single file may be selected if, for example, the user applied an amount of force to the transducer that exceeded some threshold force, indicating the user enjoys the tactile audio response. In this example, the first single file may be an appropriate tactile audio response because the first single file may include a greater magnitude tactile audio response than the second single file includes. Similarly, for example, the first single file may be selected if, for example, the user applied an amount of force to the transducer that failed to exceed some threshold force (or dipped below some threshold force), indicating the user does not enjoy the tactile audio response. In this example, the first single file may be an appropriate tactile audio response because the first single file may include a lower magnitude tactile audio response than the second single file includes. Based on any of the user preference, the user request, and/or the user profile, the first single file may be selected as potentially more enjoyable to the user based on historical force data received.

In some embodiments, the first single file and the second single file may each be associated with a generic profile. For example, the first single file may be a "guitar lover" version of "Song A" having a tactile audio response associated with at least the guitar in "Song A." The second single file may be a "drummer maniac" version of "Song A" having a tactile audio response associated with at least the drums in "Song A." In this example, the audio data for "Song A" may be the same in both the first single file and the second single file; however, the first single file may be associated with a generic guitar profile, and the second single file may be associated with a generic drums profile. In such embodiments, the first file may be selected instead of the second single file if, for example, any of the user preference, the user request, and/or the user profile indicates the first single file is more suitable to the user (e.g., more likely to be enjoyed by the user than the second single file).

At block 1030, the first single file may be transmitted to a user device of the user. For example, the first single file may be transmitted in response to the received user preference, user request, and/or user profile. Transmitting may include any method of wired or wireless communication by the server, for example, through a network. Recipients of the first single file may include any element as shown in FIG. 4.

At block 1035, the tactile audio data may be stored. For example, the tactile audio data of the first single file and/or the second single file may be stored in a location accessible via a network, such as the network 405 of FIG. 4. Such storage may include storing the tactile audio data internal or external to the server. In these or other embodiments, storage of the tactile audio data may be assessed according to trends and/or different users requesting the tactile audio data. Additionally or alternatively, the tactile audio data as stored may correspond to a "GET" tag, indicating availability for retrieval, whether streamed, downloaded, or the like.

The methods 600, 700, 800, 900, and 1000 may be performed, in whole or in part, in some embodiments in a network environment, such as the environment 400. Additionally or alternatively, the methods 600, 700, 800, 900, and 1000 may be performed by a processor, such as a processor of the server 410, as described with respect to FIGS. 4 and 5. In these and other embodiments, some or all of the steps of the methods 600, 700, 800, 900, and 1000 may be performed based on the execution of instructions stored on one or more non-transitory computer-readable media.

According to this disclosure, generally, a processor may include any suitable special-purpose or general-purpose computer, computing entity, or processing device including various computer hardware or software modules and may be configured to execute instructions stored on any applicable computer-readable storage media. For example, the processor may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

It is understood that the processor may include any number of processors distributed across any number of networks or physical locations that may be configured to perform individually or collectively any number of operations described herein. In some embodiments, the processor may interpret and/or execute program instructions and/or processing data stored in the memory. By interpreting and/or executing program instructions and/or process data stored in the memory, the device may perform operations, such as the operations performed by a processor of the server 410, as described with respect to FIGS. 4 and 5.

Further, according to the present disclosure, memory as found in servers, databases, and the like may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. In these and other embodiments, the term "non-transitory" as used herein should be construed to exclude only those types of transitory media that were found to fall outside the scope of patentable subject matter in the Federal Circuit decision of In re Nuijten, 500 F.3d 1346 (Fed. Cir. 2007). In some embodiments, computer-executable instructions may include, for example, instructions and data configured to cause the processor to perform a certain operation or group of operations as described in the present disclosure.

The subject technology is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination and/or placed into a respective independent clause, e.g., Clause 1 or 19. The other clauses can be presented in a similar manner. Additionally or alternatively, any of the following example clauses, in whole or in part, may be combined with any other example clause of the present disclosure. The following is a non-limiting summary of some examples of the present disclosure:

Clause 1. A method comprising:

accessing audio data;

obtaining tactile audio data associated with the audio data; and while reproducing the audio data, reproducing a tactile audio response according to the tactile audio data and in a manner personalized to a user via an electroactive transducer configured to transfer the tactile audio response to a body of the user.

Clause 2. The method of clause 1, wherein the electroactive transducer is one of:

wearable and configured to be integrated with at least one of a backpack, a vest, a body suit, a garment, and a piece of clothing; or non-wearable and configured to be integrated with a seat.

Clause 3. The method of clause 1, wherein reproducing the tactile audio response in the manner personalized to the user is based on a user profile.

Clause 4. The method of clause 3, further comprising:
requesting user feedback regarding the tactile audio response; and
updating the user profile such that reproduction of a future tactile audio response is personalized based on the user feedback.

Clause 5. The method of clause 3, wherein reproducing the tactile audio response in the manner personalized to the user includes at least one of:
increasing magnitude of the tactile audio response associated with at least one portion of the audio data based on the user profile;
decreasing magnitude of the tactile audio response associated with at least one portion of the audio data based on the user profile;
adding an additional tactile audio response associated with at least one portion of the audio data based on the user profile; and
omitting the tactile audio response associated with at least one portion of the audio data based on the user profile.

Clause 6. The method of clause 5, wherein increasing magnitude of the tactile audio response associated with at least one portion of the audio data based on the user profile includes increasing magnitude of the tactile audio response for a subset of a range of frequencies of the tactile audio response.

Clause 7. The method of clause 5, wherein adding the additional tactile audio response includes adding the additional tactile audio response to a portion of the audio data in a frequency range outside of a normal frequency range of typical tactile audio responses.

Clause 8. The method of clause 5, wherein omitting the tactile audio response includes removing the tactile audio response associated with a vocals track of the audio data.

Clause 9. The method of clause 3, wherein:
reproducing the tactile audio response in the manner personalized to the user includes changing the tactile audio response associated with at least one portion of the audio data based on a real-time biometric response of the user; and
the real-time biometric response of the user is analyzed with respect to a stored biometric response in the user profile.

Clause 10. The method of clause 9, wherein based on the user profile, the real-time biometric response of the user indicates at least one of: a mood, a stress level, and an energy level of the user.

Clause 11. The method of clause 9, wherein the biometric response of the user is measured by a biometric sensor configured to measure at least one of: a heart rate, a body temperature, a voice pattern, a facial expression, an eye pattern, a vein pattern, muscle tension, and blood flow.

Clause 12. The method of clause 3, wherein:
reproducing the tactile audio response in the manner personalized to the user includes changing the tactile audio response associated with at least one portion of the audio data based on an amount of force applied to the electroactive transducer by the body of the user; and
the amount of force applied to the electroactive transducer by the body of the user is analyzed with respect to stored force data in the user profile.

Clause 13. The method of clause 12, wherein the amount of force applied to the electroactive transducer by the body of the user is used to update the user profile with a preference for the tactile audio response based on the amount of force being above a threshold.

Clause 14. The method of clause 3, wherein:
the user profile includes a user preference for an audio component associated with the audio data; and
the audio component includes an audio layer or an audio source, the audio layer and the audio source including at least one of a vocal sound, an instrumental sound, an electronic sound, a synthetic sound, a background sound, and a channel.

Clause 15. The method of clause 1, wherein reproducing the tactile audio response is synchronized to reproducing the audio data.

Clause 16. The method of clause 15, wherein the synchronization between the reproduced tactile audio response and the reproduced audio data is within a threshold range of latency.

Clause 17. The method of clause 1, wherein obtaining the tactile audio data associated with the audio data includes one of:
generating the tactile audio data to be associated with the audio data; or
obtaining, from a third party electronic device, previously generated tactile audio data associated with the audio data.

Clause 18. The method of clause 17, further comprising transmitting a request to the third party electronic device for the tactile audio data, the request including at least one of an artist or a title of the audio data, and a user profile of the user.

Clause 19. A device comprising:
an electroactive transducer configured to reproduce a tactile audio response according to tactile audio data and in a manner personalized to a user, and further configured to transfer the tactile audio response to a body of the user, the electroactive transducer one of:
wearable and configured to be integrated with at least one of a backpack, a vest, a body suit, a garment, or a piece of clothing; or
non-wearable and configured to be integrated with a seat,
wherein the electroactive transducer is configured to reproduce the tactile audio response while audio data is reproduced, and
wherein the tactile audio data is associated with the audio data.

Clause 20. The device of clause 19, wherein reproducing the tactile audio response in the manner personalized to the user is based on a user profile, and includes at least one of:
increasing magnitude of the tactile audio response associated with at least one portion of the audio data based on the user profile;
decreasing magnitude of the tactile audio response associated with at least one portion of the audio data based on the user profile;
adding an additional tactile audio response associated with at least one portion of the audio data based on the user profile; and
omitting the tactile audio response associated with at least one portion of the audio data based on the user profile.

The following clauses are yet another example summary of some examples of the present disclosure. It is noted that any of the dependent clauses may be combined in any combination and/or placed into a respective independent clause, e.g., Clause 1 or 19. The other clauses can be presented in a similar manner. Additionally or alternatively, any of the following example clauses, in whole or in part, may be combined with any of the example clauses provided above:

Clause 1A. A method comprising:
obtaining audio data;
parsing the audio data to identify an audio component that includes an audio layer or an audio source;
identifying an audio attribute of the audio component;
based on the audio attribute of the audio component, selecting the audio component to accompany a tactile audio response;
generating tactile audio data that describes the tactile audio response for the selected audio component, the tactile audio data specific to the audio data and the tactile audio data configured to instruct an electroactive transducer to transfer the tactile audio response described in the tactile audio data to a body of the user; and
coordinating the tactile audio data of the selected audio component with the audio data of the selected audio component.

Clause 2A. The method of clause 1A, wherein the audio attribute includes at least one of frequency, amplitude, tonal balance, pitch, coloration, rhythm, metadata, and tags.

Clause 3A. The method of clause 2A, wherein selecting the audio component includes selecting a first audio component having a frequency below a threshold frequency and excluding a second audio component having a frequency above the threshold frequency.

Clause 4A. The method of clause 1A, further comprising excluding an audio component from being associated with a tactile audio response, the excluding based on the audio attribute of the excluded audio component.

Clause 5A. The method of clause 1A, wherein coordinating the tactile audio data includes generating a first single file that includes both the tactile audio data and the audio data.

Clause 6A. The method of clause 5A, wherein the tactile audio data and the audio data are synchronized within a threshold range of latency.

Clause 7A. The method of clause 5A, further comprising generating a second single file that includes the audio data and different tactile audio data such that the tactile audio response of the tactile audio data is different from a tactile audio response of the different tactile audio data.

Clause 8A. The method of clause 7A, further comprising:
receiving at least one of a user preference, a user request, and a user profile in conjunction with a request for the given tactile audio data or the different tactile audio data;
based on the receiving, selecting the first single file, instead of the second single file, as responsive to at least one of the received user preference, user request, and user profile; and
transmitting the first single file in response to at least one of the received user preference, user request, and user profile.

Clause 9A. The method of clause 8A, wherein:
receiving at least one of the user preference, the user request, and the user profile includes receiving biometric data associated with a biometric response of a user; and
the first single file is selected instead of the second single file based on the biometric data.

Clause 10A. The method of clause 8A, wherein:
receiving at least one of the user preference, the user request, and the user profile includes receiving force data associated with an amount of force applied to an electroactive transducer by the body of the user; and
the first file is selected instead of the second single file based on the force data.

Clause 11A. The method of clause 10A, wherein the amount of force applied to the electroactive transducer by the body of the user is used to update the user profile with a preference for the tactile audio response based on the amount of force being above a threshold.

Clause 12A. The method of clause 1A, further comprising:
storing the tactile audio data in a location accessible via a network; and
sending the tactile audio data to a user device configured to communicate with the electroactive transducer.

Clause 13A. The method of clause 1A, further comprising identifying the audio data as a known song, the identifying including at least one of:
accessing metadata associated with the audio data to identify the known song;
obtaining a waveform associated with the audio data to identify the known song; and
identifying radio data system (RDS) data associated with the audio data, including a title and an artist for the known song.

Clause 14A. The method of clause 13A, further comprising:
identifying a problem feature associated with the audio data; and
wherein generating the tactile audio data includes generating the tactile audio data based on the problem feature identified as associated with the audio data.

Clause 15A. The method of clause 1A, wherein:
selecting the audio component includes selecting an audio component outside of a typical frequency range for a typical tactile audio response; and
the tactile audio data includes an instruction regarding a tactile audio response for the audio component outside of the typical frequency range.

Clause 16A. The method of clause 1A, wherein the tactile audio data specific to the audio data includes a first set of tactile audio data specific to a first audio component.

Clause 17A. The method of clause 16A, wherein the tactile audio data specific to the audio data includes a second set of tactile audio data specific to a second audio component, the first audio component different from the second audio component.

Clause 18A. The method of clause 17A, wherein the first set of tactile audio data is different from the second set of tactile audio data.

Clause 19A. A system comprising a server configured to perform the following operations:
obtain audio data;
parse the audio data to identify an audio component that includes an audio layer or an audio source;
identify an audio attribute of the audio component;
based on the audio attribute of the audio component, select the audio component to accompany a tactile audio response;
generate tactile audio data that describes the tactile audio response for the selected audio component, the tactile audio data specific to the audio data and the tactile audio data configured to instruct an electroactive transducer to transfer the tactile audio response described in the tactile audio data to a body of the user; and
coordinate the tactile audio data of the selected audio component with the audio data of the selected audio component.

Clause 20A. The system of clause 19A, wherein:
the tactile audio data and the audio data are synchronized within a threshold range of latency;

coordinating the tactile audio data includes generating a first single file that includes both the tactile audio data and the audio data; and coordinating the tactile audio data includes generating a second single file that includes the audio data and different tactile audio data such that the tactile audio response of the tactile audio data is different from a tactile audio response of the different tactile audio data.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. The drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.). The terms "about" and "approximately" may be interpreted as less than or equal to 10% (percent) of actual value or another percentage as understood by one with skill in the art.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   accessing audio data;
   transmitting a request to a third party electronic device for tactile audio data associated with the audio data, the request including at least one of an artist or a title of the audio data, and a user profile of a user, the tactile audio data previously generated as associated with the audio data;
   obtaining the tactile audio data associated with the audio data in response to the request; and
   while reproducing the audio data, reproducing a tactile audio response according to the tactile audio data and in a manner personalized to the user via an electroactive transducer configured to transfer the tactile audio response to a body of the user.

2. The method of claim 1, wherein the electroactive transducer is one of:
   wearable and configured to be integrated with at least one of a backpack, a vest, a body suit, a garment, and a piece of clothing; or
   non-wearable and configured to be integrated with a seat.

3. The method of claim 1, wherein reproducing the tactile audio response in the manner personalized to the user is based on the user profile.

4. The method of claim 3, further comprising:
   requesting user feedback regarding the tactile audio response; and updating the user profile such that reproduction of a future tactile audio response is personalized based on the user feedback.

5. The method of claim 3, wherein reproducing the tactile audio response in the manner personalized to the user includes at least one of:
increasing magnitude of the tactile audio response associated with at least one portion of the audio data based on the user profile;
decreasing magnitude of the tactile audio response associated with at least one portion of the audio data based on the user profile;
adding an additional tactile audio response associated with at least one portion of the audio data based on the user profile; and
omitting the tactile audio response associated with at least one portion of the audio data based on the user profile.

6. The method of claim 5, wherein increasing magnitude of the tactile audio response associated with at least one portion of the audio data based on the user profile includes increasing magnitude of the tactile audio response for a subset of a range of frequencies of the tactile audio response.

7. The method of claim 5, wherein adding the additional tactile audio response includes adding the additional tactile audio response to a portion of the audio data in a frequency range outside of a normal frequency range of typical tactile audio responses.

8. The method of claim 5, wherein omitting the tactile audio response includes removing the tactile audio response associated with a vocals track of the audio data.

9. The method of claim 3, wherein:
reproducing the tactile audio response in the manner personalized to the user includes changing the tactile audio response associated with at least one portion of the audio data based on a real-time biometric response of the user; and
the real-time biometric response of the user is analyzed with respect to a stored biometric response in the user profile.

10. The method of claim 9, wherein based on the user profile, the real-time biometric response of the user indicates at least one of: a mood, a stress level, and an energy level of the user.

11. The method of claim 9, wherein the biometric response of the user is measured by a biometric sensor configured to measure at least one of: a heart rate, a body temperature, a voice pattern, a facial expression, an eye pattern, a vein pattern, muscle tension, and blood flow.

12. The method of claim 3, wherein:
reproducing the tactile audio response in the manner personalized to the user includes changing the tactile audio response associated with at least one portion of the audio data based on an amount of force applied to the electroactive transducer by the body of the user; and
the amount of force applied to the electroactive transducer by the body of the user is analyzed with respect to stored force data in the user profile.

13. The method of claim 12, wherein the amount of force applied to the electroactive transducer by the body of the user is used to update the user profile with a preference for the tactile audio response based on the amount of force being above a threshold.

14. The method of claim 3, wherein:
the user profile includes a user preference for an audio component associated with the audio data; and
the audio component includes an audio layer or an audio source, the audio layer and the audio source including at least one of a vocal sound, an instrumental sound, an electronic sound, a synthetic sound, a background sound, and a channel.

15. The method of claim 1, wherein reproducing the tactile audio response is synchronized to reproducing the audio data.

16. The method of claim 15, wherein the synchronization between the reproduced tactile audio response and the reproduced audio data is within a threshold range of latency.

17. The method of claim 1, wherein obtaining the tactile audio data associated with the audio data includes obtaining a first version of the tactile audio data instead of a second version of the tactile audio data based on the user profile.

18. The method of claim 1, wherein the audio data is initially reproduced prior to obtaining the tactile audio data during a buffer time of the tactile audio data.

19. A device comprising:
a sensor configured to measure an amount of force applied to the sensor by a body of a user; and
an electroactive transducer configured to reproduce a tactile audio response according to tactile audio data and in a manner personalized to the user based on the amount of force applied to the sensor, and further configured to transfer the tactile audio response to the body of the user, the electroactive transducer one of:
wearable and configured to be integrated with at least one of a backpack, a vest, a body suit, a garment, or a piece of clothing; or
non-wearable and configured to be integrated with a seat,
wherein the electroactive transducer is configured to reproduce the tactile audio response while audio data is reproduced, and
wherein the tactile audio data is associated with the audio data.

20. The device of claim 19, wherein reproducing the tactile audio response in the manner personalized to the user is based on a user profile, and includes at least one of:
increasing magnitude of the tactile audio response associated with at least one portion of the audio data based on the user profile;
decreasing magnitude of the tactile audio response associated with at least one portion of the audio data based on the user profile;
adding an additional tactile audio response associated with at least one portion of the audio data based on the user profile; and
omitting the tactile audio response associated with at least one portion of the audio data based on the user profile.

* * * * *